US010030580B2

(12) United States Patent
Ethier et al.

(10) Patent No.: US 10,030,580 B2
(45) Date of Patent: Jul. 24, 2018

(54) MICRO GAS TURBINE SYSTEMS AND USES THEREOF

(71) Applicant: Dynamo Micropower Corporation, Somerville, MA (US)

(72) Inventors: Jason How-Ring Ethier, Cambridge, MA (US); Ivan Wang, Boston, MA (US); Erik Herold, Somerville, MA (US); Alyssa M. Hatch, Westfield, NJ (US)

(73) Assignee: Dynamo Micropower Corporation, Somerville, MA (US)

( * ) Notice: Subject to any disclaimer, the term of this patent is extended or adjusted under 35 U.S.C. 154(b) by 299 days.

(21) Appl. No.: 14/684,272

(22) Filed: Apr. 10, 2015

(65) Prior Publication Data

US 2015/0322857 A1 Nov. 12, 2015
US 2016/0230657 A9 Aug. 11, 2016

Related U.S. Application Data

(60) Provisional application No. 62/040,688, filed on Aug. 22, 2014, provisional application No. 61/978,687, filed on Apr. 11, 2014.

(51) Int. Cl.
*F01D 15/10* (2006.01)
*F02C 6/18* (2006.01)
(Continued)

(52) U.S. Cl.
CPC .................. *F02C 6/18* (2013.01); *F02C 3/04* (2013.01); *F02C 3/22* (2013.01); *F02C 3/24* (2013.01);
(Continued)

(58) Field of Classification Search
CPC ...... F02C 3/09; F02C 6/04; F02C 6/18; F02C 7/12; F02C 7/26; F02C 7/268; F02C 7/27;
(Continued)

(56) References Cited

U.S. PATENT DOCUMENTS 3,418,485 A * 12/1968 Anderson ............... F01D 15/10
290/1 R
3,896,875 A  7/1975 Bolger
(Continued)

FOREIGN PATENT DOCUMENTS

CA    2815986         7/2013
WO    WO 02/18793 A1  3/2002
WO    WO 2004/013557 A1  2/2004

OTHER PUBLICATIONS

[No Author Listed], Flameless Heaters. MAC A Generac Company. 2015.
(Continued)

*Primary Examiner* — Gerald L Sung
*Assistant Examiner* — Rene Ford
(74) *Attorney, Agent, or Firm* — Wolf, Greenfield & Sacks, P.C.

(57) ABSTRACT

The present disclosure describes a micro gas turbine flameless heater, in which the heat is generated by burning fuel in a gas turbine engine, and the heater output air mixture is generated by transferring the heat in the gas turbine exhaust to the cold air drawn from the ambient environment. The present disclosure also describes component geometries and system layout for a gas turbine power generation unit that is designed for simple assembly, disassembly, and component replacement. The present disclosure also allows for quick removal of the rotating components of the gas turbine engine in order to reduce assembly and maintenance time. Furthermore, the present disclosure describes features that help to
(Continued)

maintain safe operating temperatures for the bearings and structures of the gas turbine engine power turbine. Lastly, the present disclosure describes features of a fuel capture system that allow the injection of wellhead gas, which typically is a mixture of gaseous and liquid fuels, into the combustion chamber, and also describes methods of incorporating afterburners in the gas turbine engine, such that the gas turbine engine system can use wellhead gas to power equipment and reduce emissions from flaring in oil and gas applications.

10 Claims, 46 Drawing Sheets

(51) Int. Cl.
- F02C 6/00 (2006.01)
- F02C 7/27 (2006.01)
- F02C 3/04 (2006.01)
- F02C 7/264 (2006.01)
- F02C 7/22 (2006.01)
- F02C 7/232 (2006.01)
- F02C 7/04 (2006.01)
- F02C 9/00 (2006.01)
- F02C 7/20 (2006.01)
- F02C 7/06 (2006.01)
- F02C 7/08 (2006.01)
- F02C 7/12 (2006.01)
- F02C 7/224 (2006.01)
- F02C 7/268 (2006.01)
- F02C 3/22 (2006.01)
- F02C 3/24 (2006.01)

(52) U.S. Cl.
CPC .............. F02C 6/00 (2013.01); F02C 7/04 (2013.01); F02C 7/06 (2013.01); F02C 7/08 (2013.01); F02C 7/12 (2013.01); F02C 7/20 (2013.01); F02C 7/22 (2013.01); F02C 7/224 (2013.01); F02C 7/232 (2013.01); F02C 7/264 (2013.01); F02C 7/268 (2013.01); F02C 7/27 (2013.01); F02C 9/00 (2013.01); F05D 2220/32 (2013.01); F05D 2220/74 (2013.01); F05D 2220/76 (2013.01); Y02E 20/14 (2013.01); Y10T 29/4932 (2015.01)

(58) Field of Classification Search
CPC .............. F02C 9/00; F02C 7/22–7/232; F02C 9/26–9/263; F05B 2220/706; F01D 15/10; H02K 7/1823
USPC .......................................................... 60/787
See application file for complete search history.

(56) References Cited

U.S. PATENT DOCUMENTS

| | | | |
|---|---|---|---|
| 3,934,409 A * | 1/1976 | Quillevere | F23R 3/34 60/733 |
| 3,937,013 A | 2/1976 | Aspinwall | |
| 3,971,210 A * | 7/1976 | Rose | F02C 7/2365 60/726 |
| 4,428,715 A | 1/1984 | Wiggins | |
| 4,560,319 A | 12/1985 | Blotenberg | |
| 4,603,548 A * | 8/1986 | Ishibashi | F02C 7/22 60/746 |
| 4,664,599 A | 5/1987 | Robbins et al. | |
| 4,747,262 A | 5/1988 | Maynard | |
| 4,770,605 A | 9/1988 | Nakatomi | |
| 4,845,941 A | 7/1989 | Paul | |
| 5,059,091 A | 10/1991 | Hatfield | |
| 5,193,989 A | 3/1993 | Fleury et al. | |
| 5,220,784 A | 6/1993 | Wilcox | |
| 5,231,822 A | 8/1993 | Shekleton | |
| 5,481,866 A | 1/1996 | Mowill | |
| 5,488,827 A | 2/1996 | Helmich et al. | |
| 5,531,633 A | 7/1996 | Riley et al. | |
| 5,533,608 A | 7/1996 | Adams et al. | |
| 5,584,174 A | 12/1996 | Bates et al. | |
| 5,628,182 A | 5/1997 | Mowill | |
| 5,692,378 A | 12/1997 | Ramsden | |
| 5,737,913 A | 4/1998 | Terry | |
| 5,932,940 A | 8/1999 | Epstein et al. | |
| 6,000,916 A | 12/1999 | Martin et al. | |
| 6,019,927 A | 2/2000 | Galliger | |
| 6,073,857 A | 6/2000 | Gordon et al. | |
| 6,161,768 A | 12/2000 | Gordon et al. | |
| 6,169,390 B1 | 1/2001 | Jungreis | |
| 6,212,917 B1 | 4/2001 | Rathbun | |
| 6,276,347 B1 | 8/2001 | Hunt | |
| 6,392,313 B1 | 5/2002 | Epstein et al. | |
| 6,471,493 B2 | 10/2002 | Choi et al. | |
| 6,536,098 B1 | 3/2003 | Luo et al. | |
| 6,539,720 B2 | 4/2003 | Rouse et al. | |
| 6,573,624 B2 | 6/2003 | Park | |
| 6,639,328 B2 | 10/2003 | Wacknov | |
| 6,651,633 B1 | 11/2003 | Jones | |
| 6,679,433 B2 | 1/2004 | Gordon et al. | |
| 6,748,742 B2 | 6/2004 | Rouse et al. | |
| 6,863,509 B2 | 3/2005 | Dewis | |
| 6,924,563 B2 | 8/2005 | Garces et al. | |
| 6,955,528 B2 | 10/2005 | Mukherjee et al. | |
| 7,010,906 B2 | 3/2006 | Cazenave et al. | |
| 7,040,278 B2 | 5/2006 | Badgley | |
| 7,065,953 B1 * | 6/2006 | Kopko | F02C 7/057 60/39.3 |
| 7,074,016 B1 | 7/2006 | Epstein et al. | |
| 7,086,833 B2 | 8/2006 | Cvjeticanin et al. | |
| 7,117,892 B2 | 10/2006 | Krywitsky | |
| 7,134,836 B2 | 11/2006 | Scherrer | |
| 7,156,618 B2 | 1/2007 | Fish et al. | |
| 7,192,062 B2 | 3/2007 | Densel et al. | |
| 7,211,906 B2 | 5/2007 | Teets et al. | |
| 7,215,098 B2 | 5/2007 | Harris et al. | |
| 7,273,348 B2 | 9/2007 | Amirtharajah et al. | |
| 7,390,163 B2 | 6/2008 | Clauson | |
| 7,402,927 B2 | 7/2008 | Belpanno et al. | |
| 7,452,182 B2 | 11/2008 | Vance et al. | |
| 7,487,641 B2 | 2/2009 | Frechette et al. | |
| 7,506,828 B2 | 3/2009 | Ayers et al. | |
| 7,517,187 B2 | 4/2009 | Hsu et al. | |
| 7,614,851 B2 | 11/2009 | Lu et al. | |
| 7,694,505 B2 | 4/2010 | Schilling | |
| 7,909,578 B2 | 3/2011 | Nishiyama et al. | |
| 7,934,368 B2 | 5/2011 | Muller et al. | |
| 7,937,947 B2 | 5/2011 | Kishibe et al. | |
| 7,955,046 B2 | 6/2011 | McCune et al. | |
| 7,976,274 B2 | 7/2011 | Lee et al. | |
| 7,997,085 B2 | 8/2011 | Moniz et al. | |
| 8,016,565 B2 | 9/2011 | Berg et al. | |
| 8,181,462 B2 | 5/2012 | Arnold et al. | |
| 8,220,262 B2 | 7/2012 | Robinson | |
| 8,297,944 B2 | 10/2012 | Chou | |
| 8,327,644 B2 | 12/2012 | Gordon | |
| 8,350,399 B2 | 1/2013 | Post | |
| 8,353,158 B2 | 1/2013 | Purdey et al. | |
| 8,366,385 B2 | 2/2013 | Davis et al. | |
| 8,387,243 B2 | 3/2013 | An et al. | |
| 8,418,457 B2 | 4/2013 | Schmidt | |
| 8,464,539 B2 | 6/2013 | Pelletier et al. | |
| 8,485,775 B2 | 7/2013 | Pickard | |
| 2002/0149205 A1 | 10/2002 | Gilbreth et al. | |
| 2005/0121909 A1 | 6/2005 | Densel et al. | |
| 2005/0126175 A1 | 6/2005 | Badgley | |
| 2007/0165973 A1 | 7/2007 | Belpanno et al. | |
| 2008/0000238 A1 | 1/2008 | Ribaud et al. | |
| 2008/0022653 A1 | 1/2008 | Schilling | |

(56) References Cited

U.S. PATENT DOCUMENTS

| | | | |
|---|---|---|---|
| 2008/0048456 A1 | 2/2008 | Browning et al. | |
| 2008/0141643 A1* | 6/2008 | Varatharajan | F02C 1/002 60/39.5 |
| 2008/0159857 A1 | 7/2008 | Jonsson | |
| 2010/0133832 A1 | 6/2010 | Butt | |
| 2010/0176592 A1 | 7/2010 | Artes de Arcos Marco | |
| 2010/0251692 A1 | 10/2010 | Kinde, Sr. | |
| 2010/0272508 A1 | 10/2010 | Vichinsky | |
| 2010/0295308 A1 | 11/2010 | Post | |
| 2011/0038706 A1 | 2/2011 | Lefebvre et al. | |
| 2011/0154822 A1 | 6/2011 | Protz et al. | |
| 2011/0318175 A1 | 12/2011 | Converse | |
| 2012/0167591 A1 | 7/2012 | Drachsler et al. | |
| 2012/0171037 A1 | 7/2012 | R et al. | |
| 2012/0180488 A1 | 7/2012 | Bailey et al. | |
| 2012/0210728 A1 | 8/2012 | Wang et al. | |
| 2012/0319408 A1 | 12/2012 | Plotsker | |
| 2012/0324898 A1 | 12/2012 | McMahan et al. | |
| 2013/0005237 A1* | 1/2013 | Baten | F02C 3/32 454/252 |
| 2013/0071243 A1 | 3/2013 | Kocher et al. | |
| 2013/0104551 A1 | 5/2013 | Uhm et al. | |
| 2013/0104552 A1 | 5/2013 | Uhm et al. | |
| 2013/0156552 A1 | 6/2013 | Barlog | |
| 2013/0192219 A1 | 8/2013 | Maier | |
| 2013/0269348 A1 | 10/2013 | Ethier et al. | |
| 2014/0130500 A9 | 5/2014 | Ethier et al. | |

OTHER PUBLICATIONS

[No Author Listed], Multi-Wafer Rotating MEMS Machines: Turbines, Generators, and Engines from MEMS Reference Shelf. Ed.: J. H. Lang. Springer Science+Business Media, LLC. 2009. 14 Pages. doi:10.1007/978-0-387-77747-4.

[No Author Listed], Technology Characterization: Microturbines. Prepared for: Environmental Protection Agency, Washington, DC, USA. Mar. 2002; 27 Pages.

Frechette et al., High-speed microfabricated silicon turbomachinery and fluid film bearings. IEEE, Feb. 2005;14(1):141-52. doi:10.1109/JMEMS.2004.839008.

Isomura et al., Development of Micromachine Gas Turbine for Portable Power Generation. The Japan Society of Mechanical Engineers. Series B, 2004;47(3): 459-464.

Matsuo et al., Towards the Development of Finger-Top Gas Turbines. Proc. International Gas Turbine Congress. Tokyo, Japan. Nov. 2-7, 2003.

McDonald et al., Small Recuperated Ceramic Microturbine Demonstrator Concept. Applied Thermal Engineering. Jan. 2008;28(1):60-74.

Pehnt et al., Environmental impacts of distributed energy systems—The case of micro cogeneration. In: Environmental Science and Policy. Elsevier, Feb. 2008;11:25-37.

Peirs et al., A microturbine for electric power generation. Sensors and Actuators A. Feb. 2004;113:86-93.

Vick et al., Engine Design Strategies to Maximize Ceramic Turbine Life and Reliability. J. Eng. Gas Turbines Power. Jun. 2011;134(8):081301. 11 Pages. doi:10.1115/1.4005817.

* cited by examiner

| Total Power Out (kW) | Minimum Pipe Size (in) | Chosen Pipe Size (in) | Actual Mach Number |
|---|---|---|---|
| 9 | 1.20 | 1.75 | 0.14 |
| 13 | 1.45 | 1.75 | 0.21 |
| 14 | 1.35 | 1.75 | 0.18 |
| 19 | 1.50 | 1.75 | 0.22 |
| 20 | 1.50 | 1.75 | 0.22 |
| 21 | 1.50 | 1.75 | 0.22 |
| 23 | 1.75 | 1.75 | 0.30 |
| 24 | 1.74 | 1.75 | 0.30 |
| 25 | 1.53 | 1.75 | 0.23 |
| 29 | 1.74 | 1.75 | 0.30 |

FIG. 25

Assembled  Exploded View

MICRO GAS TURBINE SYSTEMS AND USES THEREOF

RELATED APPLICATIONS

This application claims priority under 35 U.S.C. § 119(e) to U.S. Provisional Application Ser. No. 62/040,688, entitled "MICROTURBINE FLAMELESS HEATER AND METHOD OF CONTROLLING AND OPERATING THE SAME" filed on Aug. 22, 2014, and to U.S. Provisional Application Ser. No. 61/978,687, entitled "MICROTURBINE SYSTEMS AND USES THEREOF FOR OIL AND GAS APPLICATIONS" filed on Apr. 11, 2014, which are herein incorporated by reference in their entirety.

BACKGROUND INFORMATION

Micro gas turbines are emerging as a means for distributed power generation, particularly in areas with little to no electrical grid infrastructure. A gas turbine engine at a minimum has a gas generator, which includes a compressor, a turbine on the same shaft as the compressor and powers the compressor, and a combustion chamber within which fuel is combusted. The turbine of the gas generator is sometimes called a core turbine or a high pressure turbine. The gas generator converts energy produced by the combustion of the fuel into mechanical work in the form of a rotating turbine, which powers the compressor and sustains the gas turbine operation. The operation of the gas turbine engine can be described by the Brayton cycle.

In addition to the gas generator, a gas turbine engine can have a power turbine that accepts exhaust from the turbine to generate additional mechanical shaft power. The power turbine is sometimes called a low pressure turbine. In addition to the power turbine, a gas turbine engine can have an electric generator connected to the power turbine shaft, such that the gas turbine engine produces electric power. In the latter case, the gas turbine engine is also called a gas turbine generator.

BRIEF SUMMARY OF THE INVENTION

Aspects of the disclosure relate to improved micro gas turbines and related systems. In some aspects of the disclosure, micro gas turbine flameless heaters are provided. Some aspects of the present disclosure provide solutions that overcome disadvantages of conventional gas turbine design, including complexity of system architecture, difficulty of maintenance, and lack of robustness in applications without tightly controlled environments and operating points. Gas turbine engines disclosed herein are useful in part because they enable commercially viable power generation systems for remote generation applications, including the upstream oil and gas industry.

In some embodiments, micro gas turbine flameless heaters are provided that contain a gas turbine engine with associated startup and ignition mechanisms, an air pumping system that draws in air from ambient environment, a control system that controls the startup and shutdown procedures as well as controls the fuel flow to tune heater output temperature, and a heater output production system that uses the heat from the gas turbine exhaust to increase the temperature of the ambient air and produce a heated air mixture that is sent out of the heater. In some embodiments, the disclosure provides two general types of gas turbine flameless heaters, a mechanical gas turbine flameless heater and an electromechanical gas turbine flameless heater, that are designed to address and solve many of the problems with current flameless heater models mentioned above. In both types, the heat is generated by burning fuel in a gas turbine engine. In some embodiments, the present disclosure uses the term "microturbine" and "micro gas turbine" to refer to a gas turbine engine that may produce shaft or electric power output in the range of 1 to 250 kilowatts, or that may produce heat output on the order of 1 to 10 million BTU/hr.

In some embodiments, a mechanical microturbine flameless heater is provided, in which microturbine startup and ignition mechanisms, air pumping systems, control systems, and heater output production systems do not require electric power to operate. One type of mechanically-powered air pump is an air amplifier, which is a type of eductor that moves air using a compressed air source and does not require moving parts or the need for external electric power. A mechanically-powered air pump makes the flameless heater system more robust and reduces the need for maintenance and electricity. The mechanical microturbine-based flameless heater also includes a completely mechanical control system comprising a series of valves and flow control orifices, and autonomous pressure- and temperature-driven safety regulators, thus completely eliminating the need for electronics. One type of mechanical heater output production system is a mixing duct that mixes the heated turbine exhaust stream with the ambient air drawn from one or more mechanically-powered air pumps, such that the overall mixture is a heated air flow stream that is then sent out of the heater.

In one embodiment of the mechanical microturbine flameless heater, the prime mover consists of a microturbine based on an automotive turbocharger, modified with a passive lubrication system. The combustion chamber driving the turbine is custom designed and completely contains the flame of combustion within the combustion chamber. The combustor is ignited during startup by a magneto ignition system, which generates a high-voltage spark using induction by passing a permanent magnet by a conductive coil and does not require an external electric power source.

As an example, the embodiment of the mechanical microturbine flameless heater includes two air amplifiers that pump cold air from the ambient environment into a mixing region within the flameless heater, where the ambient air mixes with the microturbine exhaust to create a heated air stream at a desired temperature and flow rate for the flameless heater output. The air amplifiers are powered with a compressed air stream which is bled out of the microturbine system after it passes through the compressor. This compressed air passes over a specifically designed profile within the air amplifier, which allows the air amplifier to entrain air from its surroundings. This air is then mixed inside of a larger duct with the exhaust from the microturbine system to form the heated air stream, which is sent out of the flameless heater by means of a larger heater duct as the heater output stream.

As an example, the embodiment of the mechanical microturbine flameless heater discussed above contains two identical air amplifiers that allow the flameless heater to create a heater output mixture with the desired temperature and air flow. However, the mechanical microturbine flameless heater may in general include one or more amplifiers of the same or different sizes, or include a fan that is driven by the microturbine engine shaft, to act as mechanically-powered air pumps to deliver the desired amount of ambient air and create heater output mixtures of different temperatures and flow rates.

The fuel tank temperature may be regulated by a custom designed mechanical feedback system in order to keep the fuel at a usable pressure at ambient temperatures as low as −30° C. One embodiment of a mechanical fuel tank pressure and temperature control system is an adjustable louver that will direct some of the heater output stream towards the fuel tank. The louver is adjusted using a pneumatic actuator powered by the propane tank pressure itself to create a feedback system to prevent overheating.

Fuel enters the combustor of the microturbine by way of a mechanical fuel flow control system. This system consists of a series of valves and orifice plates that are designed to control the input of fuel during ignition and during operation at design point. In one embodiment of the microturbine flameless heater, ignition may be achieved with approximately 0.25 g/s of propane, and at design point the heater may use between 3 g/s and 5 g/s of propane. The control system may also contain a separate valve for low-temperature startup to account for the low propane vapor pressure at these temperatures.

Another part of the mechanical control system is the emergency over-temperature shutdown system. One embodiment of this system consists of a self-actuated temperature regulator which is governed by a fully mechanical, pneumatic-driven sensor and switch system. The regulator is intended to shut off the fuel supply to the combustor, thus shutting down the turbine system, if the flow becomes hot enough to damage the turbine.

In some embodiments, an electrically-assisted microturbine flameless heater is provided, which is referred to as an electromechanical microturbine flameless heater in this disclosure. One embodiment of an electromechanical microturbine flameless heater comprises a microturbine engine, a generator as a source of electric power, a fan as an air pumping system, a microturbine ignition mechanism, and a microturbine starter mechanism, and a heater output production system. Fuel is connected to the generator first, and the generator is started to begin producing electric power. Any one or combination of fan, microturbine ignition mechanism, and microturbine starter mechanism may be mechanically powered, or may be powered using the electric power produced by the generator. Fuel is then connected to the microturbine engine combustor. The starter mechanism and the ignition mechanism for the microturbine are then activated such that the microturbine can start producing hot exhaust gas from fuel, such as propane or flare gas. A fan draws in cold air from the ambient environment, and the heater output production system uses the high temperature microturbine exhaust to heat up the cold air drawn from the ambient environment. One type of heater output production system is a mixing duct that mixes the microturbine exhaust with the ambient air to produce a heated mixture that can be sent out of the heater as the heater output.

In some embodiments, an electromechanical microturbine flameless heater may incorporate any combination of elements of the mechanical control system of the mechanical microturbine flameless heater, such as the mechanical fuel tank pressure and temperature control system, the fuel flow control system, and the emergency over-temperature shutdown system.

As an example, the microturbine engine of any of the embodiments discussed above is designed to run on propane, which is readily available on most oil fields or construction sites. Controlled propane combustion may produce fewer harmful emissions than diesel or gasoline combustion, which allows the microturbine exhaust stream to be mixed directly into the heater output stream. However, microturbine engines also have the ability to run on natural gas or associated petroleum gas (also known as flare gas). Therefore, the mechanical microturbine flameless heater or the electromechanical microturbine flameless heaters may use flare gas, which is not a processed fuel and may cause worse emissions than natural gas or propane, in applications where emissions is less of a concern. Examples of such applications include heating the ground for construction or drilling, heating up equipment overnight, and heating up locations when people are not present.

For both mechanical and electromechanical microturbine flameless heaters, one embodiment of a heater output production system is a mixing duct that mixes the hot microturbine exhaust with the ambient air drawn by air pumping systems to produce a heated air mixture that is sent out of the heater as the heater output. Another embodiment of a heater output production system is a heat exchange system in which a heat exchanger takes in ambient air on the cold side and microturbine on the hot side, transfers heat to the ambient air flow to raise the ambient air flow temperature, and produces a heated air stream that is sent out of the heater as the heater output. In this embodiment, the heater output contains only air and does not contain microturbine exhaust, and the microturbine exhaust is discharged from the heater through a separate outlet.

In certain aspects, the present disclosure provides component geometries and system layouts for a microturbine power generation units that are configured for simple assembly, disassembly, and component replacement. In some embodiments, subsystems for microturbine power generation units provided herein include but are not limited to: radial compressor(s) and turbine(s), combustion chamber, electric motor/generator(s), and system chassis/housing. In some embodiments, components of each subsystem are configured such that the assembly of each subsystem only requires stacking of the components, aligning, and securing them together with fasteners. In some embodiments, all of the components are stacked in a linear fashion, and secured to the system chassis by standard fasteners. A complete power generation unit is built by assembling the required subsystems.

In some embodiments, the disclosure provides microturbine power generation systems having interchangeable subsystems, including but not limited to compressor, combustor, and turbine subsystems. In some embodiments, a compressor and turbine are modular such that different sizes or geometries can be easily swapped with no modification to the overall system being required.

In some embodiments, the disclosure provides a power generation unit that contains multiple microturbine engines, such that the power output from multiple engines can be combined together in a single unit to generate a larger amount of power. This can be done, for example, to generate a larger amount of power output instead of re-designing a single microturbine engine to provide larger power output.

In some embodiments, the disclosure provides a fuel capture system that attaches to a micro gas turbine power generation system such that it can be used to provide primary power generation in upstream oil and gas by burning wellhead gas. In some embodiments, the fuel capture system takes unprocessed wellhead gas from the gas outlet of a high pressure 2-phase or 3-phase separator, and a control system regulates the pressure and mass flow of the gas based on the micro gas turbine engine's operating temperature and the measured system power output.

In some embodiments, the disclosure provides a micro gas turbine power generation unit that includes afterburners to burn additional fuel, including wellhead gas. The afterburner can increase the power output of the engine, and in addition can serve to replace flare systems or thermal oxidizers that are already in the field.

BRIEF DESCRIPTION OF THE DRAWINGS

The accompanying drawings are not intended to be drawn to scale. The figures are illustrative only and are not required for enablement of the disclosure. For purposes of clarity, not every component may be labeled in every drawing. In the drawings:

FIG. 25 shows a non-limiting embodiment of flow path sizes for a series of microturbine engines that are sized for a variety of power outputs;

DETAILED DESCRIPTION

Figure 1:
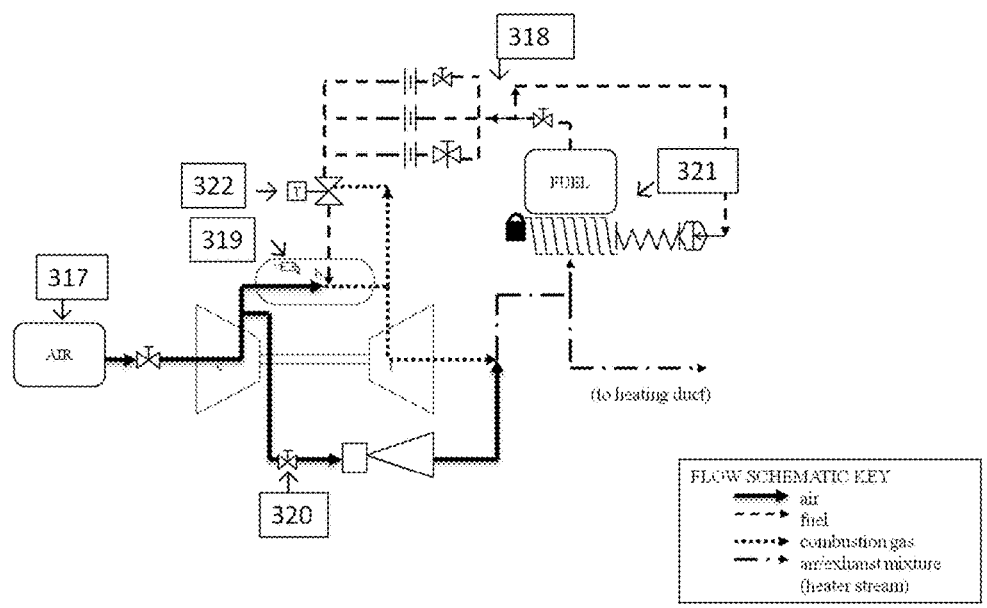
FIG. 1 shows a non-limiting embodiment of a full schematic of the flow path through a mechanical flameless heater system, including the components of the mechanical control systems.

The disclosure generally relates to improved micro gas turbines and related systems. For example, in some embodiments, micro gas turbine flameless heaters are provided. In some embodiments, solutions are provided that overcome disadvantages of conventional gas turbine design, including complexity of system architecture, difficulty of maintenance, and lack of robustness in applications without tightly controlled environments and operating points. Gas turbine engines disclosed herein are useful in part because they enable commercially viable power generation systems for remote generation applications, including the upstream oil and gas industry.

Gas turbine engines are traditionally large engines that produce shaft power or electric power on the order of megawatts. A micro gas turbine engine typically produces shaft power or electric power on the order of kilowatts. Furthermore, as disclosed herein, a gas turbine engine with only a core gas generator is also useful for generating heat, which may be used for space heating, processing heating, or other heating applications.

In heating applications, in particular in industrial space heating and process heating, there are two types of products which have been conventionally used in the marketplace. The first type of product is a flameless heater containing a reciprocating diesel engine that drives a fluid shear device to generate heat using friction, a fan that drives ambient air through the flameless heater, and a heat exchanger that transfers heat from the fluid shear device to the ambient air. On average, mid-range flameless heaters on the market produce about 700,000 BTU of heat per hour, with an output stream whose temperature is 180° F. higher than ambient, and the heater outputs between 3,000 to 5,000 CFM total air flow. They typically weigh on the order of 4,000 lbs. and have outer dimensions of about 12'×6'×5'.

Current models are relatively inefficient systems due to the energy losses that come from the shear heaters and heat exchangers. The flameless heater is large because it needs a mechanical diesel engine to produce the heat, whereas gas turbine engines are more compact for the same heat output. The diesel engine and fluid shear heater are components with many moving parts, which require frequent maintenance. Lastly, diesel fuel is much more expensive than natural gas or propane on an energy content (e.g. BTU) basis, so the operating cost for a conventional flameless heater is high.

The second type of conventional product is a gas turbine heater containing a diesel-fueled gas turbine engine that produces hot gas at the gas turbine exhaust, and a fan that is driven by the gas turbine engine to draw ambient air into the heater, and the hot gas is either mixed directly with the ambient air or the heat from the exhaust is transferred to the ambient air using a heat exchanger. The diesel-fueled gas turbine heater has the same high operating cost as the conventional flameless heater because it uses diesel as the fuel. The diesel-fueled gas turbine heater is also a more complicated mechanical system with more interconnected parts, including an electric generator that acts as a motor during startup and a fuel delivery system that is required to preheat, vaporize, and deliver diesel fuel to the combustion chamber. The diesel-fueled gas turbine heater has many integrated components that do not easily allow end manufacturers to customize the heater to end users' different requirements, including heater air flow output and electric power output for auxiliary equipment. Lastly, there is demand from manufacturers and distributors in the industrial heating industry to move towards an OEM business model, wherein the end manufacturer can put different supporting equipment, such as gas turbine starter, fan, and additional electric generator, around a gas turbine engine to suit a variety of customer needs without developing completely new gas turbine heater for each application. This model is not easily accomplished with a tightly integrated gas turbine heater design. In contrast, aspects of this disclosure, relate to improved micro gas turbine heater designs.

In power generation applications, gas turbine engine and micro gas turbine engines have traditionally been complicated in their mechanical design, and as a result assembly, disassembly, and maintenance require a lot of time and equipment. Therefore, their use is usually limited to applications in which the ambient environment, fuel inputs, and lubrication inputs are finely controlled and monitored. An example of this type of application is a stationary large power plant. One application that has poorly controlled inputs and environmental conditions is using wellhead gas (also called flare gas, or associated gas) to power equipment at oil and gas wells. In this application, the fuel quality is not well controlled, the generator would be subject to a variety of weather conditions, and the generator would be in a remote location and the surrounding environment and equipment would not be constantly monitored. As an example, the poor quality of the fuel may result in accelerated corrosion of internal components, which would require more frequent maintenance. As another example, despite efforts to implement advanced controls to minimize operator mistakes, operator error may still result in damages to the equipment that would also require maintenance. Maintenance activities primarily focus on the rotating components of the gas turbine engine, including the shaft, rotor, and bearings. Aspects of this disclosure, provide micro gas turbine engines that address deficiencies in current designs.

Gas Turbine Heater

Figure 2:
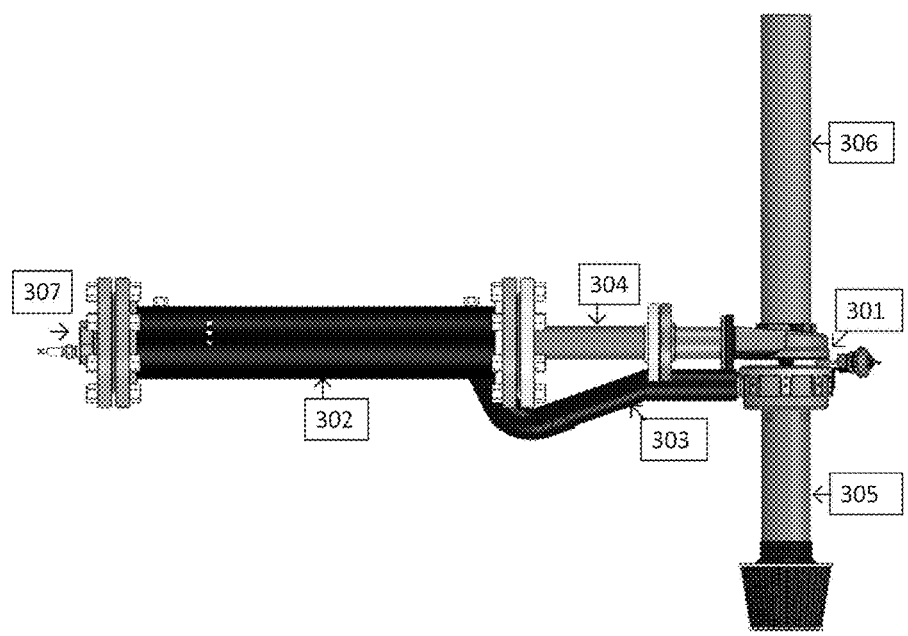
FIG. 2 shows a non-limiting embodiment of a top view rendering of a microturbine engine system, including the turbocharger, combustion chamber, and all associated plumbing.

In some embodiments, the disclosure provides improved gas turbine flameless heaters. In some embodiments, the prime mover of a gas turbine flameless heater is a gas turbine engine, shown in FIG. 2. This engine consists of two components, the turbocharger (301) and combustion chamber (302), as well as intermediate plumbing that carry air from the compressor outlet to the combustor inlet (303) and air-fuel mixture from the combustor outlet to the turbine inlet (304). In addition, there is an inlet port for drawing air into the compressor (305) and an exhaust port for carrying exhaust from the turbine (306). In addition to releasing the exhaust which will be used for heating, the core turbine powers the attached compressor to sustain the desired amount of air flow and the desired amount of pressure rise through the gas turbine engine.

Figure 3:
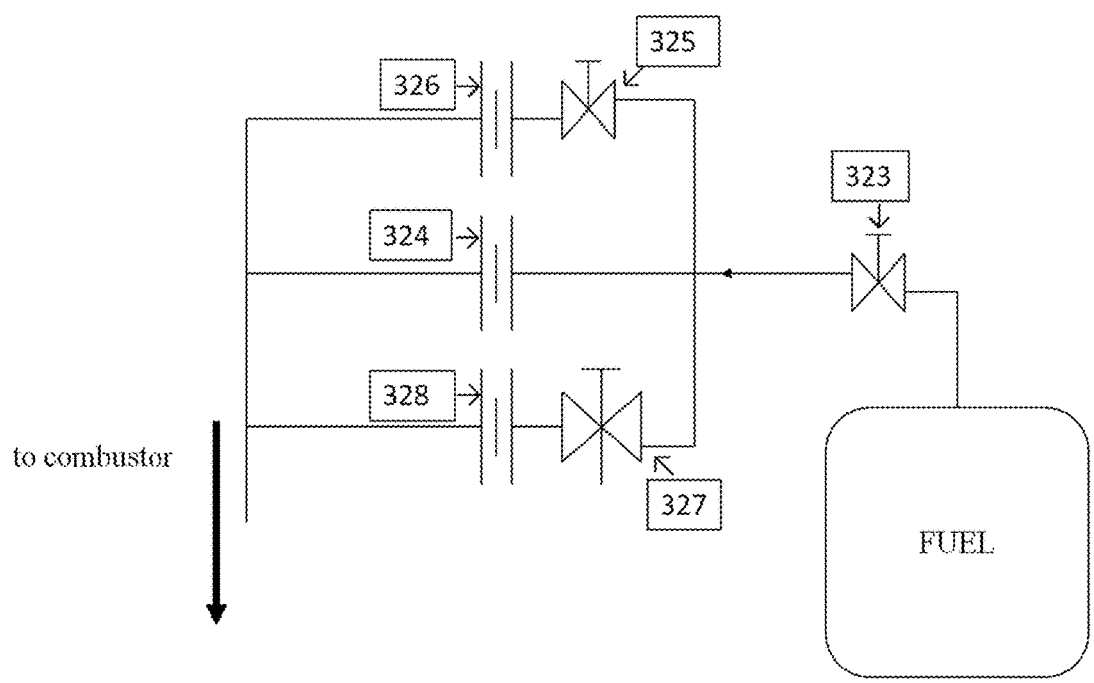
FIG. 3 shows a non-limiting embodiment of a schematic of a mechanical fuel control system.
Figure 4:
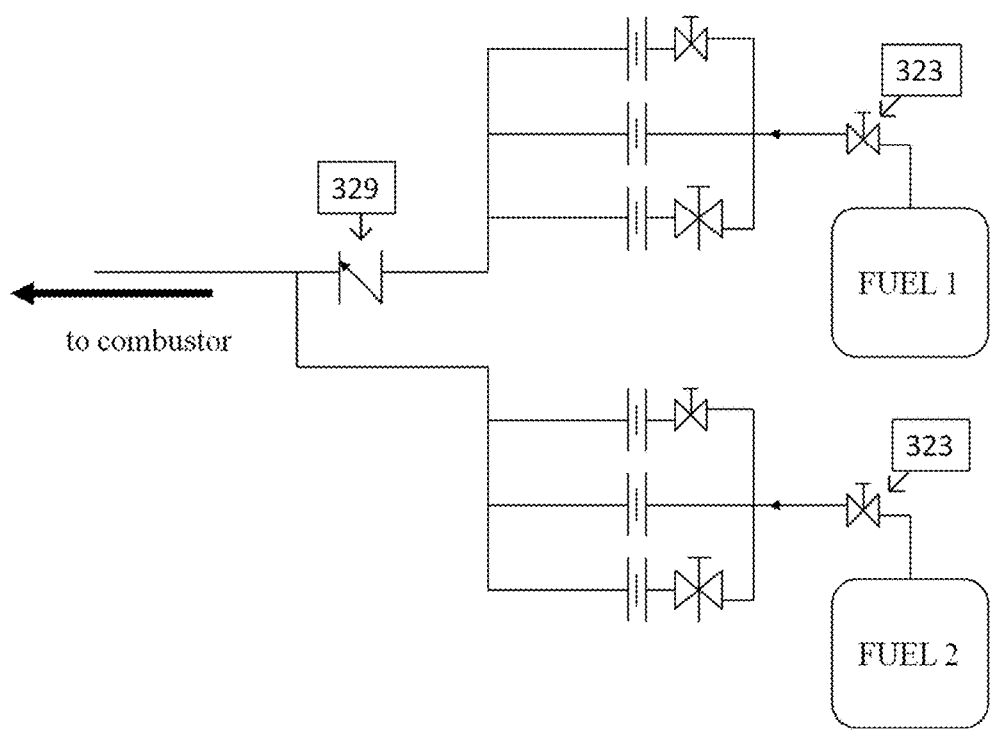
FIG. 4 shows a schematic of a non-limiting embodiment of a dual-fuel control system which allows the user to choose between two types of fuel, such as propane and natural gas, on which to run the microturbine engine.

The fuel for combustion enters the combustor through a main fuel line (307) after passing through a mechanical fuel control system (FIG. 3). The gas turbine heater may use liquid petroleum gas, which is primarily propane and is also referred to as LPG, as the fuel. However, the gas turbine engine can also run on natural or flare gas, so other embodiments of the flameless heater may use these fuels instead of, or in addition to, propane. The fuel system may be modified, such as changing the diameters of the orifice plate holes, to optimize the fuel system for a different fuel without changing the flow paths or overall fuel system architecture. In addition, the flow path of the fuel system may be modified to allow two different fuel inputs. FIG. 4 shows a fuel control system designed to allow the user to select from two fuel sources.

Flare gas is not a processed fuel, and as a result the emissions produced from flare gas combustion may be worse than the emissions produced from natural gas or propane combustion. As a result, flameless heater operators may not want to direct heater output directly into areas where there is personnel working in the field. However, the flameless heaters described in this disclosure may burn flare gas in applications where emissions is less of a concern, for example, to heat the ground for drilling or to heat equipment overnight. The combustor may be optimized to limit emissions, and the mechanically-powered air pumps, either air amplifiers or fans in any of the flameless heater configurations described in the present disclosure, will also dilute the exhaust stream to create a heater stream with lower total levels of emissions.

Figure 5:
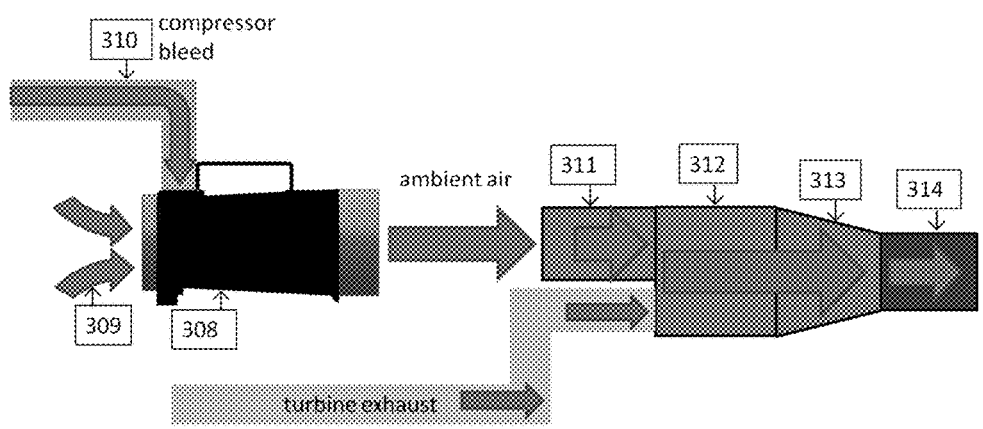
FIG. 5 shows a layout of a non-limiting embodiment of an exhaust dilution system that uses one air amplifier, including all associated plumbing and a port for the post-compressor bleed air that is used to power the air amplifier.

In addition to dilution, the purpose of the air amplifier system (FIG. 5) is to produce an overall heater output stream of lower temperature and higher flow rate than the turbine exhaust itself which may be used to drive the desired amount of heat and air flow into the surrounding environment. The amplifier itself (308) may be a type of eductor which uses the principles of entrainment or the Coanda effect to move a large volume of ambient air (309) without the use of moving parts or external power. It is driven by a motive flow of compressed air, which in this system is diverted from the main turbine system through a bleed line (310) which branches from the post-compressor plumbing. Examples of vendors that supply air amplifiers include Nex Flow Air and EXAIR.

In one embodiment of the mechanical gas turbine flameless heater, the compressor operates at a pressure ratio of 2.1 to 1, the compressor outlet bleed flow is approximately 16 psig, and the air amplifier is designed to draw approximately 50 SCFM of motive air at this motive pressure and amplify the motive air flow by a factor of 16. The air stream produced by the amplifier will pass into a large duct (311) that leads into a mixing region with the gas turbine exhaust.

The large duct is placed at a distance from the amplifier outlet in order to not interrupt the amplifier exit flow entraining additional air from the surrounding, and also allows the stream to develop fully. This duct will lead to another (312), where it will be mixed with the exhaust from the turbine, and then finally this mixture will pass through an area-reducing coupling (313) to allow it to enter the hose (314) which will carry the stream from the enclosure to its intended destination.

Figure 6:
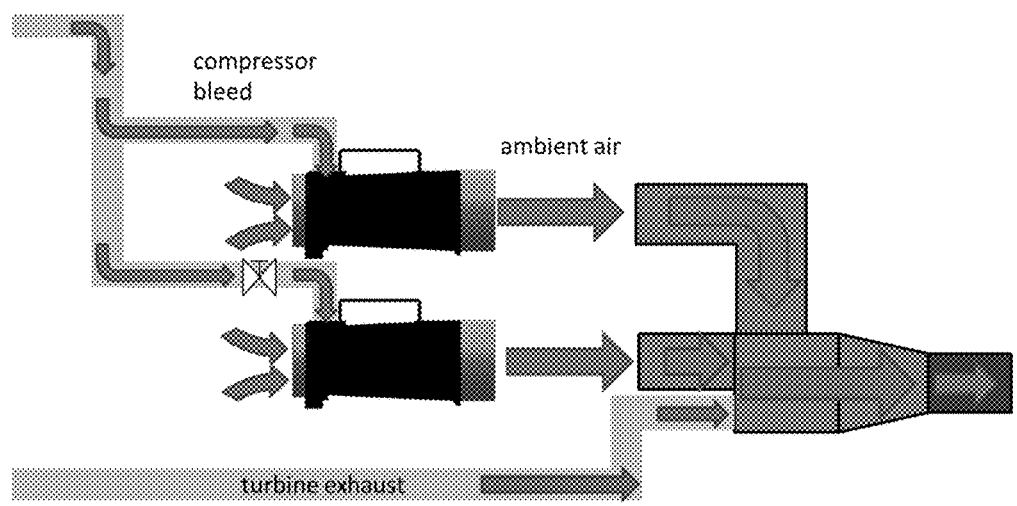
FIG. 6 shows a layout of a non-limiting embodiment of an exhaust dilution system that uses two air amplifiers in parallel, and all associated plumbing.

In order to further dilute and speed up the heater stream, multiple air amplifiers may be used in parallel, all driven by the post-compressor bleed. In one embodiment of the mechanical gas turbine flameless heater, the system uses two air amplifiers in the parallel configuration, as shown in FIG. 6. Other embodiments may use one or more air amplifiers, of the same or different sizes, depending on the needs of the user. The individual air amplifiers may also be partially filled in or the motive flow may be limited by needle valves to further tune the amount of amplification created by the overall system in other embodiments.

Figure 7:
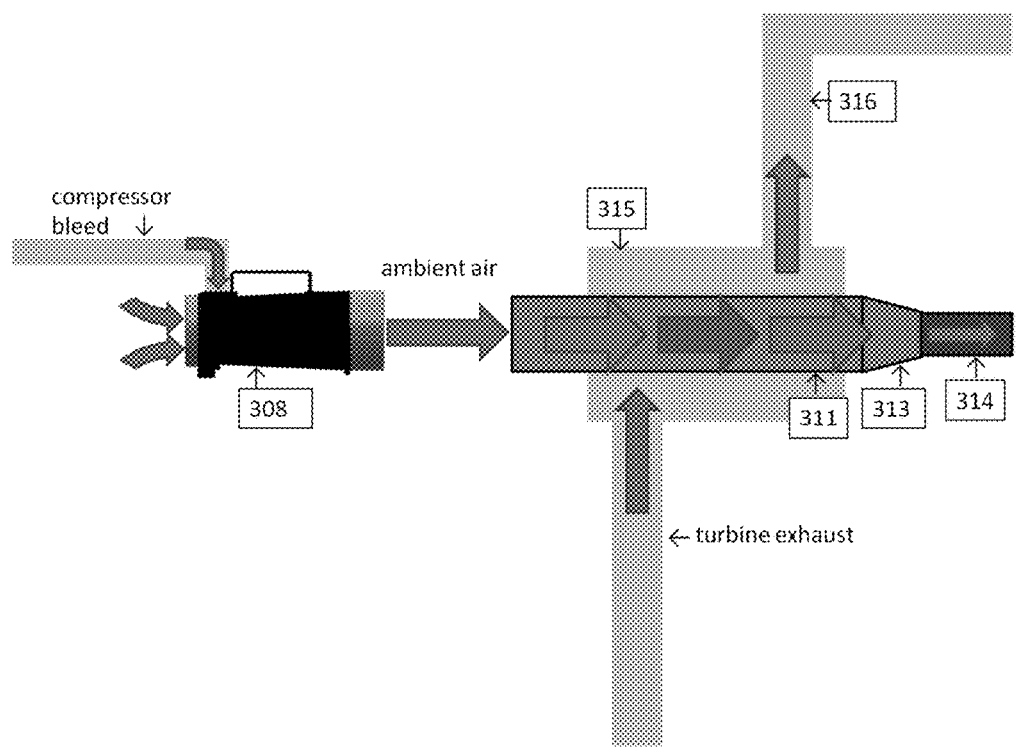
FIG. 7 shows a schematic of a non-limiting embodiment of a system in which the air amplifier is used to blow air over a heat exchanger that obtains heat from microturbine exhaust, in order to create a clean heater stream free from combustor emissions.

FIG. 7 shows an alternative configuration for the air amplifier system which is designed to reduce the concern about emissions safety at the cost of some energy losses. This system involves using an air amplifier (308) to blow air over a heat exchanger (315) containing the exhaust. The air amplifier stream will move a portion of the heat from the exhaust to the environment outside of the enclosure after passing through a large duct (311), area-reducing coupling (313), and hose (314). The large duct is placed at a distance from the amplifier outlet in order to not interrupt the amplifier exit flow entraining additional air from the surrounding. The exhaust itself will be released from the top of the enclosure through a separate duct (316), and is not meant to come in contact with people.

The entire heater system is controlled by a completely mechanical control system, the major components of which are shown in the overall system schematic in FIG. 1. The control system allows the user to control the startup and shutdown of the system during normal operation, as well as to control for emergency shutdown conditions in the case of overheating. The major components of the control system are the compressed air starter (317), fuel control system (318), ignition (319), bleed control (320), propane tank regulation system (321), and over-temperature emergency shutdown system (322).

Figure 8:
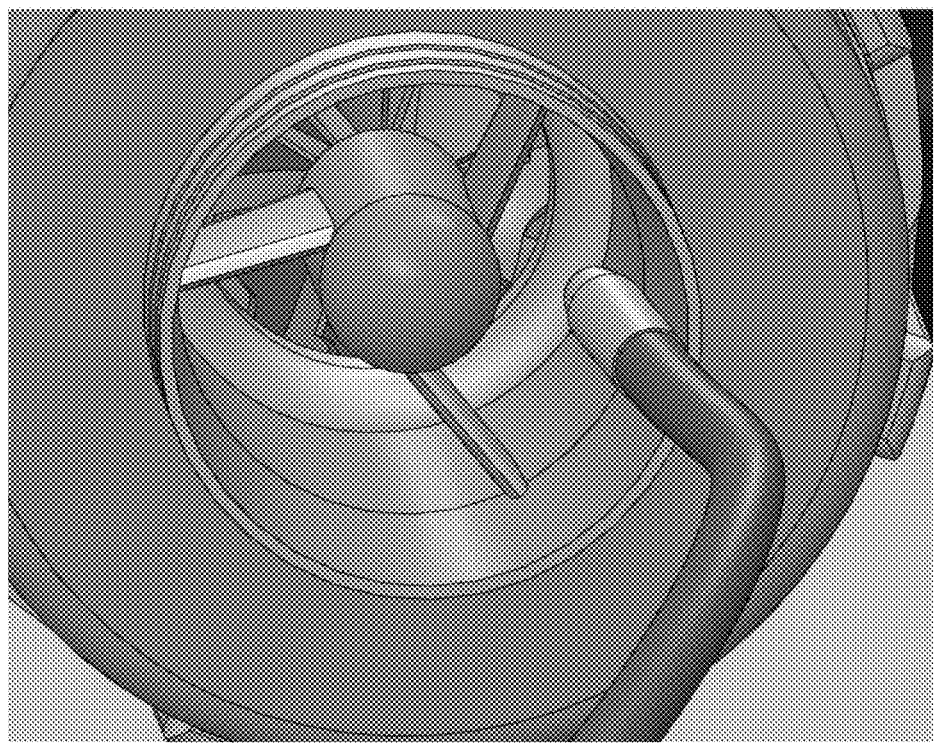
FIG. 8 shows a rendering of a non-limiting embodiment of a nozzle positioned near the compressor inlet in order to allow the compressor to be started using a compressed air tank.

The gas turbine heater is started with an air starter. In this embodiment, the air starter is a compressed air start system (317) that has a nozzle that can be used to start the compressor using compressed air from a standard compressed air tank. The nozzle and compressor inlet are rendered in FIG. 8. In one embodiment of the mechanical gas turbine flameless heater, a 100 psi compressed air source can spin up the compressor enough to flow up to 40 SCFM through the gas turbine engine, which is enough to bring the gas turbine engine up to self-sustaining operation.

The amount of fuel flowing into the system differs at various points in the start-up process and operation, and is controlled by a series of valves and orifice plates which make up the fuel control system (318), shown in detail in FIG. 3. The main ball valve (323) opens the fuel line and allows a small amount of fuel, restricted by the starter orifice plate (324) to flow into the combustor for startup. In one embodiment, this orifice plate is designed to restrict the starter flow to approximately 0.25 g/s when the upstream pressure of the fuel is about 5.6 psig, which is the vapor pressure of propane at −30° F. A second ball valve (325) may be opened when the temperature rises, so that the fuel may pass through a second orifice plate (326) designed to restrict the flow at vapor pressures of up to about 31 psig, the vapor pressure of propane at 10° F. Future embodiments may use different orifice sizes to account for other temperature or pressure ranges. In addition to these two valves and orifice plates, the main needle valve (327) and orifice plate (328) are in place to allow the user to gradually increase the amount of fuel flowing into the system up to about 5 g/s once it has reached self-sustaining operation.

Other embodiments of the gas turbine flameless heater may include an option for selecting between multiple types of fuel, such as propane and natural gas, either manually (323) or by means of a pressure-driven gate (329). A schematic of such a system is shown in FIG. 4.

Figure 9:
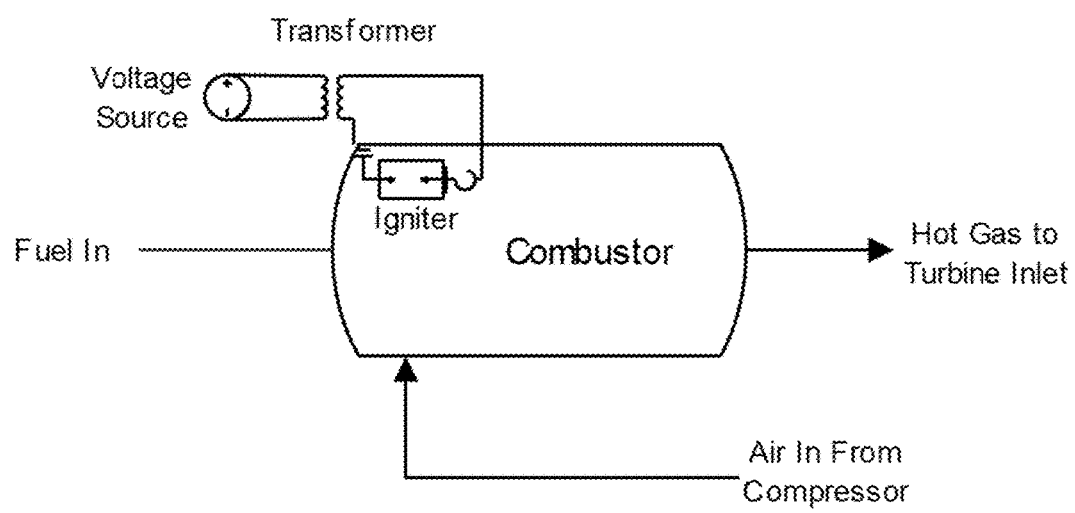
FIG. 9 shows a non-limiting embodiment of an ignition system that is attached to the combustor; For a magneto ignition system, the voltage supply is powered by mechanical action.

The ignition of the combustor, once the air and fuel starter valves have been open, is accomplished using a magneto ignition system (319) designed specifically to fit the combustor. This system provides a spark without the use of an external electric power source by inducing a current using a magnet passing by a tightly-wound coil. FIG. 9 shows the ignition system attached to the combustor. Future embodiments may use other ignition systems that do not require external electricity, such as the piezoelectric starts used on some grills.

Once the engine has reached steady-state operation, the operator may open the post-compressor bleed valve (320), shown in FIG. 1, to activate the air amplifier system. This valve may be a gate or needle valve which has the capacity to allow up to about 120 SCFM of post-compressor air to leave the turbine system and flow to the air amplifiers. The bleed valve should not be opened until the engine has reached the desired operating point, in order to avoid overheating of the turbine components during startup.

Figure 10:
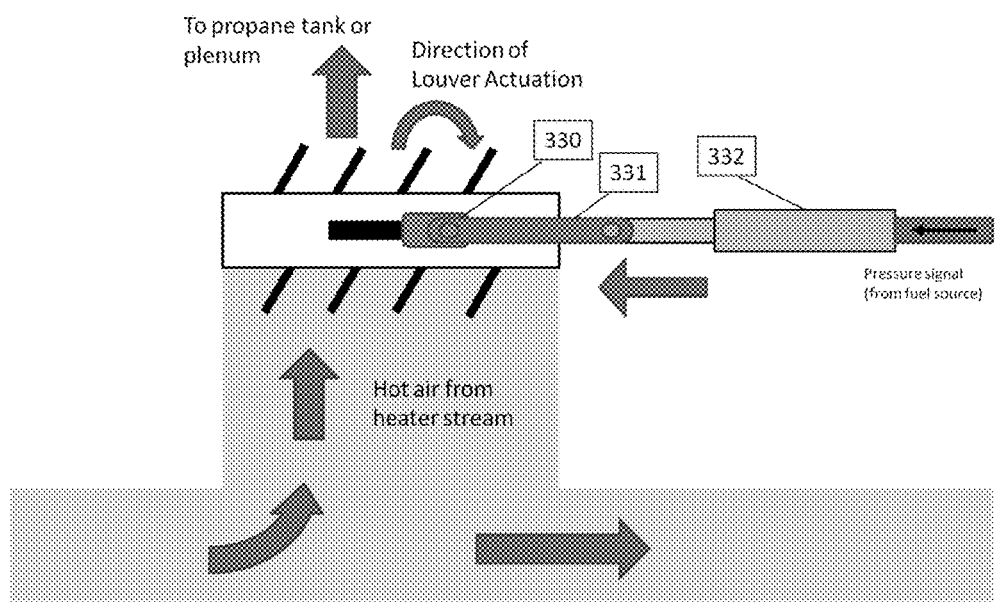
FIG. 10 shows a rendering of a non-limiting embodiment of a fuel tank temperature regulation system, which includes an adjustable louver connected to the heater stream driven by a pneumatic linear actuator and a linkage system.

The fuel tank regulation system (321) in FIG. 1 is designed to regulate the temperature of the propane tank such that the pressure of the incoming fuel is high enough to power the system. The system is designed to keep the tank in the range of about 10° F., in order to keep it from overheating while still allowing enough fuel flow to run the engine. In one embodiment of a gas turbine flameless heater, shown in FIG. 10, the system consists of an adjustable louver which will release some of the heater stream air onto the fuel tank. The adjustment handle of the louver (330) is connected via several linkages (331) to a pneumatically driven linear actuator (332).

Figure 11:
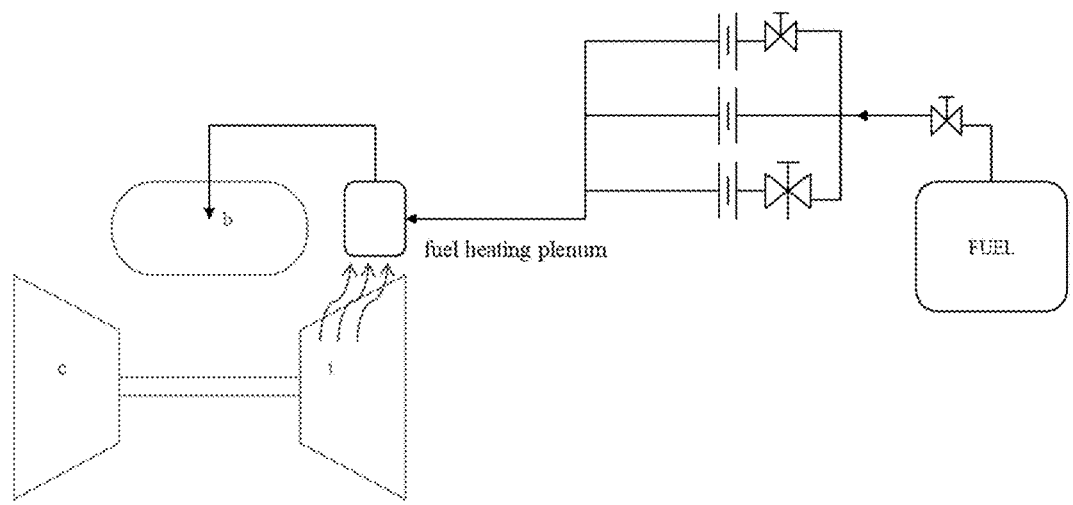
FIG. 11 shows a schematic a non-limiting embodiment of a fuel tank temperature regulation system, in which heat from the heater stream or from a controlled exothermic reaction is used to pressurize a smaller amount of fuel before it enters the engine.

In another embodiment, the incoming fuel may instead be heated in a smaller plenum apart from the main tank (FIG. 11), in order to minimize the risk of overheating the whole tank and causing an explosion. This smaller plenum may be heated directly by radiation and convection from the turbine itself. The heating unit may also be a controlled exothermic reaction such as those found in hand warmers, in order to allow the fuel to be heated before the system starts producing exhaust.

In one embodiment of the gas turbine flameless heater, the over-temperature shutdown control (322) consists of a self-actuating temperature control valve which cuts off the fuel supply line to the combustor when the temperature of one of the gas turbine engine components exceeds a temperature which corresponds to the maximum allowable flow temperature of the system. The component temperature is measured in the embodiment if the temperature control valve is not rated up to the gas turbine flow temperature. The value of engine component surface temperature that corresponds to the maximum allowable temperature may be tuned in experiments. The maximum allowable flow temperature is limited by turbo-machine materials, and is nominally around 1200 K for one embodiment of the flameless heater that uses an automotive turbocharger as the compressor and turbine of the gas turbine engine. In another embodiment in which an over-temperature control valve can operate up to the maximum allowable gas turbine inlet flow temperature or the gas turbine exhaust flow temperature, the over-temperature control valve may measure the gas turbine inlet flow temperature or the gas turbine exhaust flow temperature directly. The sensor may be calibrated or insulated to adjust the trip temperature of the valve in other embodiments.

The above specifications describe a mechanical gas turbine flameless heater that uses a gas turbine engine to generate heat, and an air amplifier to generate air flow, and does not require electrical components to operate. Another type of a gas turbine heater is an electromechanical gas turbine flameless heater that uses a generator to provide electric power for one or more pieces of electrical equipment that are a part of the flameless heater system.

Figure 12:
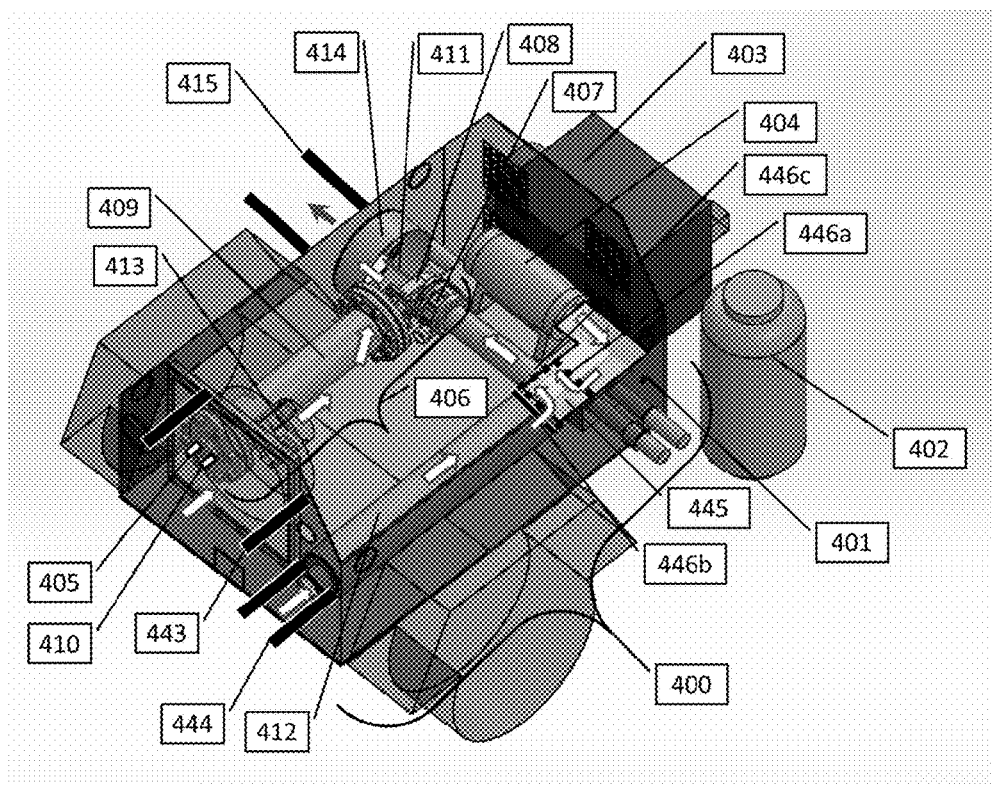
FIG. 12 shows a schematic of a non-limiting embodiment of an electromechanical microturbine flameless heater with air start; The major components include a microturbine engine, a generator, a fan, and an electric air blower as the air start mechanism for the microturbine engine; The enclosure is sealed to control air flow inside the enclosure and reduce the amount of required ducting.

In one embodiment of an electromechanical gas turbine flameless heater, the system includes the following components: an enclosure, a gas turbine engine, a generator, a fan, and a starter for the gas turbine engine. Furthermore, the enclosure may be mounted on a trailer such that it is easily transported. Fuel is sent into the generator first, and the generator is started to begin producing electric power. The generator then powers the starter and the ignition for the gas turbine engine, such that the gas turbine engine can be started to produce hot exhaust gas from fuel, such as propane or wellhead gas. Lastly, the generator powers a fan that draws in ambient air such that the air mixes with the gas turbine exhaust to produce a heated mixture of ambient air and combustion gases, and the resulting mixture has the desired temperature for a flameless heater. FIG. 12 shows a possible layout for an electromechanical gas turbine flameless heater comprising these components. A flameless heater fuel inlet (401) accepts fuel from a fuel source. One example of a fuel source is a LPG tank (402). The fuel is first allowed into a generator (403), and the generator is started up to begin producing electric power. Electric power is then made available to an air starter (404), a gas turbine igniter (405), and a fan (413). The air starter is then activated, fuel is allowed into the gas turbine engine (406), and the igniter (405) is activated to achieve sustained combustion, and additional fuel is allowed to flow into the gas turbine engine to bring the gas turbine engine (406) up to self-sustaining operation. The initial air flow from the air starter allows ignition to occur inside the gas turbine engine. After the gas turbine engine to reach self-sustaining operation, the air start can be de-activated. The gas turbine engine includes a compressor stage (407), a turbine stage (408), and a combustion chamber (409). The basic operation of the gas turbine engine is as follows. The compressor (407) draws in ambient air at the gas turbine inlet, compresses the air up to higher pressure, and sends the air into the combustion chamber (409). The fuel is injected into the combustion chamber (409) at the gas turbine fuel inlet (410) and mixes with the compressed air, and the mixture is burned in the combustion chamber to produce hot pressurized gas. The hot pressurized gas then enters the turbine (408), and the turbine extracts power out of the hot pressurized gas. The gas then exits the gas turbine engine through the gas turbine engine exhaust (411). The gas turbine engine may have a muffler downstream or upstream of the gas turbine to reduce noise. In FIG. 12, the gas turbine engine has a muffler (412) upstream of the gas turbine inlet.

The gas turbine engine is capable of accepting gaseous fuel. Examples of gaseous fuels include compressed natural gas (CNG) and liquefied petroleum gas (LPG). CNG primarily consists of methane, and LPG primarily consists of propane. The gaseous fuel may also be wellhead gas or flare gas, which the gas produced at an oil or gas well onsite but is not further treated in a refinery. The gaseous fuel may also be a mixture of a combustible gas with a non-combustible gas, for example a mixture of methane, propane, nitrogen, and/or carbon dioxide. A gas turbine heater that can accept gaseous fuel as a fuel input has advantages over the prior art, which include heaters driven by diesel reciprocating engines, and heaters driven by diesel gas turbine engines. From the perspective of operating expenses, a gas turbine heater that can accept gaseous fuels allows low cost fuels to be used to operate the heater. From the perspective of apparatus reliability, a gas turbine heater that can accept gaseous fuels is not prone to carbon deposits in the fuel delivery system, which does occur for diesel-fueled gas turbine engines.

One embodiment of an air starter is an air blower that directs air into the gas turbine compressor inlet. The following describes two embodiments of air flow paths for this air starter. In one embodiment of air flow paths for an air blower air starter, the gas turbine compressor inlet accepts air from one port (444). During startup, the air blower is activated and the air blower hose is connected to the compressor inlet, such that the air blower provides starting air flow into the gas turbine engine. At this point, there is measurable pressure at the compressor inlet. After ignition and additional fuel input to bring the gas turbine engine to a point at which the engine can self-sustain, the compressor inlet pressure will be near zero, and air blower hose may be removed from the compressor inlet such that the gas turbine engine can start drawing air from ambient under the engine's own power, the air blower may be turned off, and a filter may be added in front of the compressor inlet to prevent foreign objects from entering the gas turbine engine. In a second embodiment of air flow paths for an air blower air starter, the gas turbine compressor inlet accepts air from an inlet pipe system, which has two ports, the air blower port and the ambient port. During startup, the ambient port is closed such that no air can flow through, and the air blower is activated to send air into the compressor inlet. At this point, there is measurable pressure at the compressor inlet. When the gas turbine engine reaches an operating point at which the engine can self-sustain, the pressure at the compressor inlet will be near zero. At this point, the ambient port is opened to allow additional air flow through, and the air blower may be turned off. One method of opening and closing the ambient port is with an automotive throttle body that is in line with the ambient port flow path. The throttle body may be opened by pulling an automotive throttle cable that is attached to a lever on the throttle body on one side, and attached to a handle on the other side. The handle may be locked in place with a handle lock to keep the throttle body open. When the throttle body needs to be closed, the heater operator may release the handle lock and the return spring on the throttle body will pull the handle back to its original position such that the throttle body is closed.

Another method of opening and closing the ambient port is with an electric motor that controls a valve at the ambient air inlet. The electric motor can be powered to close the valve during gas turbine startup, and the electric motor can be powered to open the valve during self-sustaining gas turbine operation. In one embodiment, a diverter valve, typically placed at an automotive exhaust, can be used at the gas turbine inlet as an inlet flow diverter 445. The inlet flow diverter has two inlets 446a, 445b, one outlet 446c, and one of the inlets has a valve that is driven by an electric motor. The inlet flow diverter has similar form and function as the inlet pipe system described in this disclosure, but the only difference is that for the inlet flow diverter the ambient flow is controlled by a valve driven by an electric motor, and for the inlet pipe system the ambient flow path is controlled by a throttle body.

While the gas turbine engine is operating and producing hot exhaust gas, the fan (413) is also powered by the electric generator to draw in air from outside the enclosure (400) through an air inlet port (443). The outside air is mixed with the gas turbine exhaust stream in a mixing duct (414) to produce a heated mixture of air and exhaust that has the desired temperature for a flameless heater. The heated mixture is then directed out of the enclosure (400) through the heater exhaust duct (415). The heater exhaust can be divided into multiple exits. For example, a flameless heater may have two outlet ports, which can be used to direct the heated air in two different directions. In the embodiment shown in FIG. 12, the mixing is accomplished by sealing the enclosure such that the fan (413) draws ambient air into the enclosure, and the air is forced to travel into the heater mixing duct (414). The gas turbine exhaust port (411) directs the gas turbine exhaust stream into the heater mixing duct (414). Therefore, the cold ambient air mixes with the hot gas turbine exhaust stream in the heater mixing duct (414) before exiting the heater through the heater exhaust duct (415). This embodiment reduces the amount of ducting required inside the heater enclosure, which is advantageous because the structural integrity of the ducting and associated mounts may be susceptible to vibrations during transport of the heater.

A gas turbine heater whose gas turbine engine is started with an air starter has advantages over the prior art, specifically when compared to the heaters that are driven by diesel gas turbine engines. The prior art uses an electric generator that is attached to the compressor wheel to start the gas turbine engine by first running the generator as a motor. An air starter is advantageous because it allows off the shelf turbochargers to be used as the core gas generator of the gas turbine engine, whereas an electric motor start requires a means for connecting the motor shaft to the compressor shaft. The advantage of using off the shelf turbocharger is that the same heater design may be used with different turbochargers to obtain different gas turbine air flow and heat outputs.

Furthermore, the inclusion of a separate fan and a separate electric generator in the gas turbine heater system makes the gas turbine heater more modular. The fan is separate from the gas turbine engine, and is not powered either mechanically or electrically by the gas turbine engine. The electric generator is also separate from the gas turbine engine, and is not powered by mechanical shaft power output from the gas turbine engine. The electric generator may be a motor-generator set, such as a small reciprocating diesel generator. In a gas turbine heater, however, the electric generator is much smaller than the reciprocating engine required for a conventional flameless heater, because in the former the heat comes from the gas turbine, and in the latter the heat comes from the shaft power of the reciprocating engine. The fan size can be changed to adjust the gas turbine heater total air flow output. The electric generator size can be changed to adjust the total electric power output, which is useful in the case that different customers want to power different external equipment with the heater.

In one embodiment of the gas turbine heater, the electric generator may use the same fuel as the gas turbine engine, and the electric generator may receive fuel from the gas turbine engine fuel manifold. In another embodiment of the gas turbine heater, the electric generator may use a different fuel from the gas turbine engine, and the fuel manifold outlet that is intended to supply the generator with fuel may be plugged up, and a second fuel source may be set up to supply the electric generator.

Furthermore, the modular design of a gas turbine heater disclosed herein addresses the market demand for a heater whose auxiliary components can be rapidly reconfigured to serve a variety of different customers without designing a completely new heater and manufacturer completely new components for each customer. The modular design also allows the gas turbine engine and controller to be an independent product, and an original equipment manufacturer (OEM) can build a heater around the gas turbine engine and controller by choosing the appropriate fan, air starter, and electric generator for the OEM's specific applications.

Figure 13:
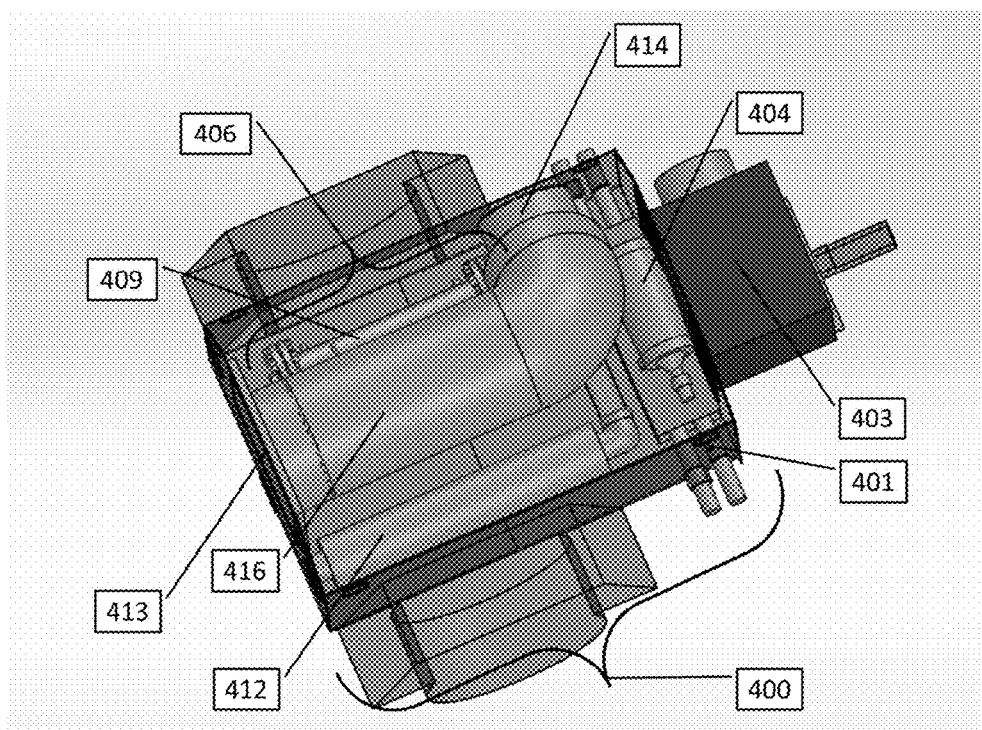
FIG. 13 shows another schematic of a non-limiting embodiment of an electromechanical flameless heater with air start; The enclosure is not sealed but the ducting on the inside of the enclosure allows the air flow to mix properly with the microturbine exhaust before the entire mixture exits the heater.

FIG. 13 shows a different possible enclosure design for an electromechanical gas turbine flameless heater. In this embodiment, the mixing of ambient air and hot gas turbine exhaust can be accomplished by not sealing the enclosure, and having a fan duct (416) that forces the ambient air into the heater mixing duct (414), and also ducting the gas turbine exhaust stream into the same heater mixing duct (414). In this case, the enclosure does not need to be sealed because the fan duct (416) ensures that the ambient air drawn in by the fan will go to the heater mixing duct (414). This embodiment reduces the amount of sealing required for the heater enclosure, which is advantageous because the integrity of the seal may be susceptible to cold temperatures and general wear and tear from use.

Figure 14:
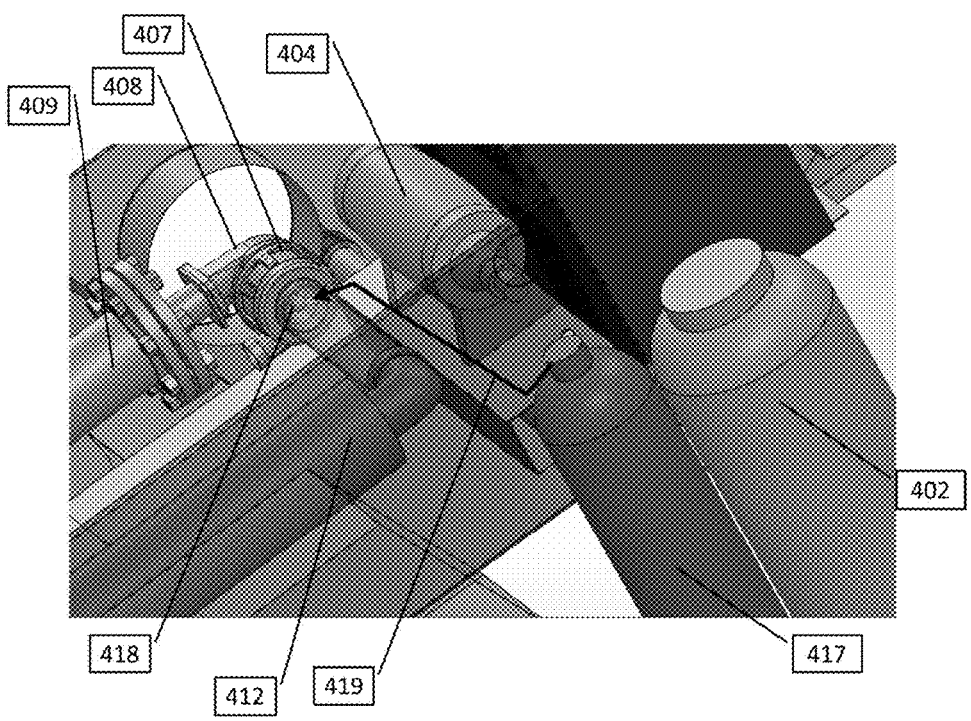
FIG. 14 shows another schematic of a non-limiting embodiment of an electromechanical flameless heater with air start; The major components include a microturbine engine, a generator, a fan, and a compressed air source as the air start mechanism for the microturbine engine.

FIG. 14 shows another embodiment of an air starter for the flameless heater. In this embodiment, the air starter is a compressed air tank (417) whose exit nozzle is directed at the compressor wheel at the compressor inlet. During the starting sequence, the compressed air is sent through the nozzle, travels through the compressed air flow path (419), and impinges upon the compressor wheel (418), which rotates the compressor wheel and draws in additional air. This then allows ignition in the combustion chamber (409) and also allows the gas turbine engine to be brought up to self-sustaining operation. After the gas turbine engine reaches self-sustaining operation, the compressed air source may be turned off.

In another embodiment of an air starter for the flameless heater, the gas turbine engine is started using an electric starter motor that applies torque to enable rotation of the compressor wheel during start up. The method by which the starter motor applies torque to the compressor wheel may be a clutch that engages during the startup sequence and disengages when power is not being sent to the startup motor. This action draws in air and allows ignition in the combustion chamber and also allows the gas turbine engine to be brought up to self-sustaining operation. After the gas turbine engine reaches self-sustaining operation, the power to the starter motor may be cut off to stop the motor from spinning.

Figure 15:
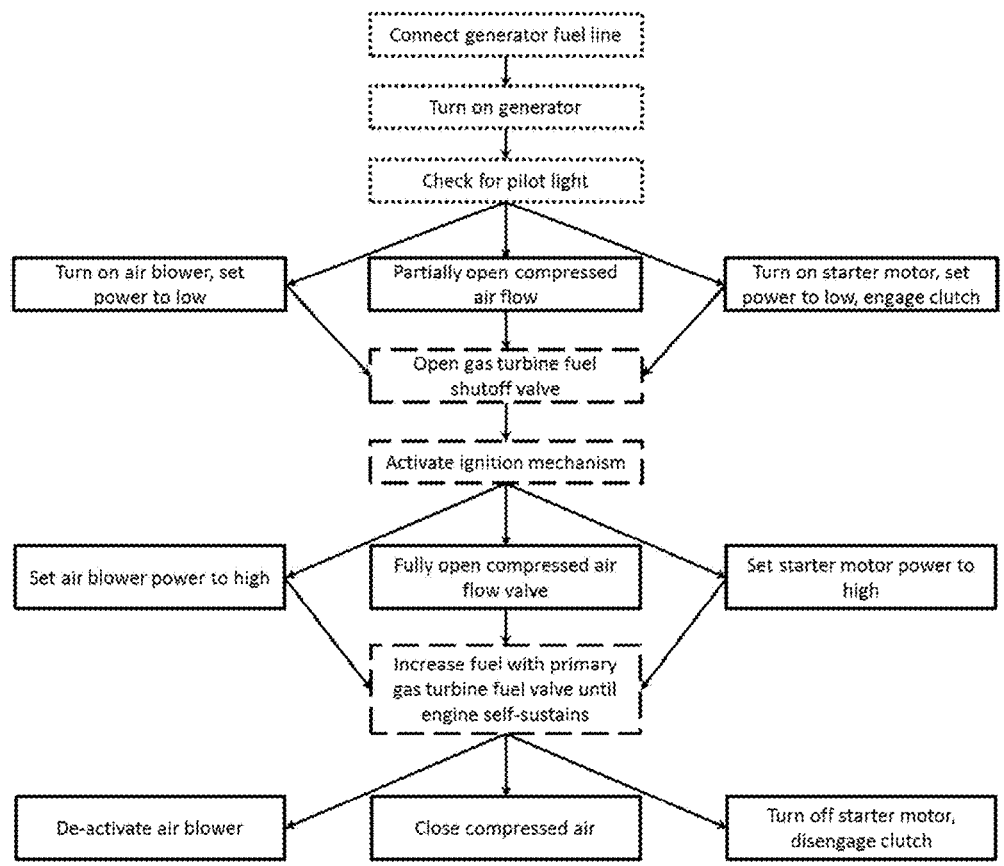
FIG. 15 shows a non-limiting embodiment of a flowchart with three possible startup sequences for three different embodiments of an electromechanical flameless heater; The different startup sequences share similar steps, but have different microturbine startup mechanisms.

FIG. 15 shows the heater startup sequences for the three possible embodiments of an electromechanical gas turbine flameless heater. The three embodiments share similar steps during the startup sequence, but the steps are different for the three different gas turbine engine startup methods: air blower, compressed air, and electric motor start. In FIG. 15, the first column refers to a flameless heater with an air blower air starter, the second column refers to a compressed air starter, and the third column refers to an electric motor starter.

Figure 16:
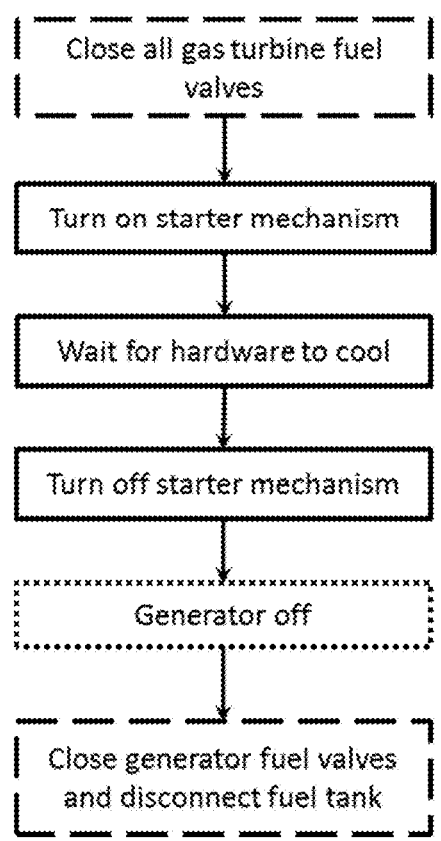
FIG. 16 shows a non-limiting embodiment of a flowchart for a possible shutdown sequence for an electromechanical microturbine flameless heater.

The following procedure is one possible method for shutting down an electromechanical gas turbine flameless heater. First the gas turbine fuel inlet (410) is closed such that the micro turbine will slow down. Then the starter, for example an air blower (404), is re-activated to draw cool air through the gas turbine engine and allow the gas turbine engine components to cool down. Sufficient cool down may be determined by a low enough heater exhaust temperature or by sufficient duration, typically on the order of minutes. After the gas turbine engine cools down, the starter is de-activated, and the generator may be turned off to stop electric power production and fuel draw into the generator. After this step, the fuel may be disconnected from the heater fuel inlet (401). FIG. 16 shows a shutdown sequence for an electromechanical gas turbine flameless heater. The shutdown sequence may be the same for flameless heaters with different gas turbine starters. For example, electromechanical gas turbine flameless heaters with different gas turbine starters discussed in this disclosure (air blower, compressed air, and electric motor) may all use the same shutdown sequence described in FIG. 16 because the steps that involve the gas turbine starters all provide the same function of cooling down the gas turbine engine hardware before completely shutting down the flameless heater.

Figure 17A:
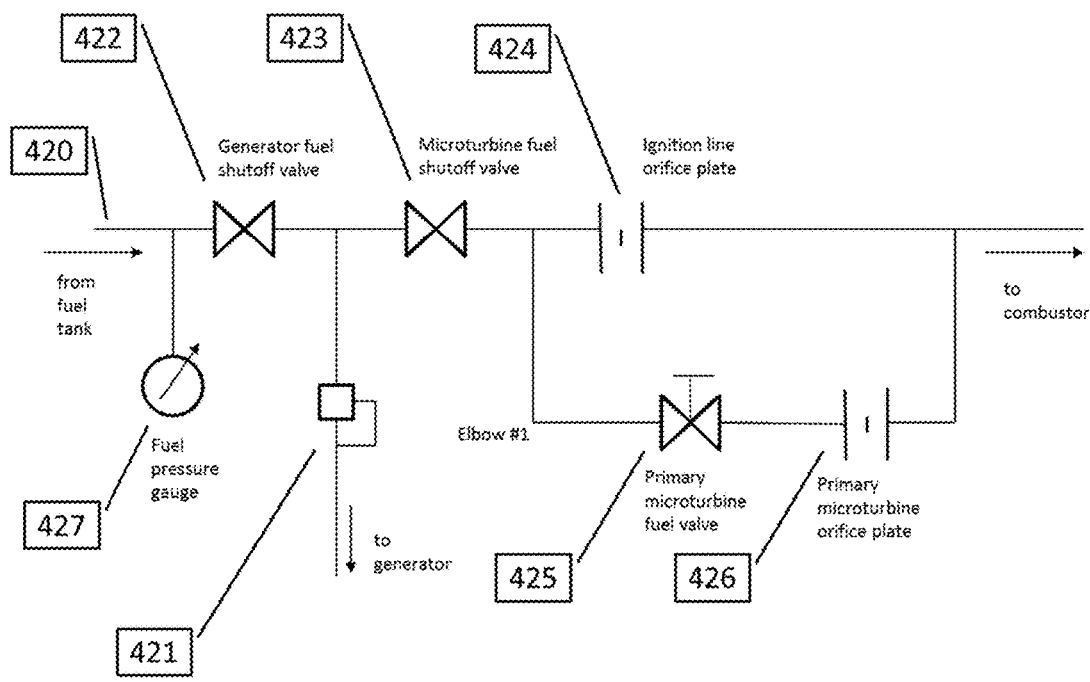
FIG. 17A shows a flow diagram of a non-limiting embodiment of the fuel system, including valves, regulators, and other plumbing hardware for one embodiment of an electromechanical flameless heater.

FIG. 17A shows one possible fuel manifold diagram for the electromechanical gas turbine flameless heater system. The fuel manifold has a fuel inlet (420), and the fuel is split between the generator and the gas turbine engine. A pressure regulator (421) reduces the fuel pressure going into the generator, and a generator fuel shutoff valve (422) allows the flameless heater operator to turn on and shut off the fuel going into the generator. An additional metering valve may be included in line if the generator does not come with its own fuel metering system.

For the fuel going into the gas turbine engine, the fuel line has valves and switches to allow the operator to control the amount of fuel going into the gas turbine engine. The gas turbine fuel shutoff valve (423) allows the operator to turn on and shut off the fuel going into the gas turbine engine. The gas turbine fuel supply line splits into two lines. One line allows enough fuel to flow into the combustion chamber (409) for obtaining ignition, and the fuel flow is controlled by an ignition line orifice plate (424) that limits the volume flow going into the combustor. A second line allows enough fuel to flow into the combustion chamber (409) for spooling up the gas turbine engine and reaching the highest allowable exhaust temperature. The fuel flow in this second line is metered by a primary gas turbine fuel valve (425) that can be controlled by the flameless heater operator, and the total fuel flow is limited by the primary gas turbine orifice plate (426). The fuel pressure is monitored by a fuel pressure gauge (427) that the operator may read to see whether the fuel source has sufficient pressure to power the heater. In this embodiment of the fuel system, the generator and gas turbine engine use the same type of fuel. In another embodiment of the fuel system, the generator and gas turbine engine may use different types of fuel, in which case the fuel system would have two inlets, one for the generator and one for the gas turbine. The generator line would have a generator pressure regulator as described above. The gas turbine fuel line would have metering valves and shutoff valves as described above.

Figure 17B:
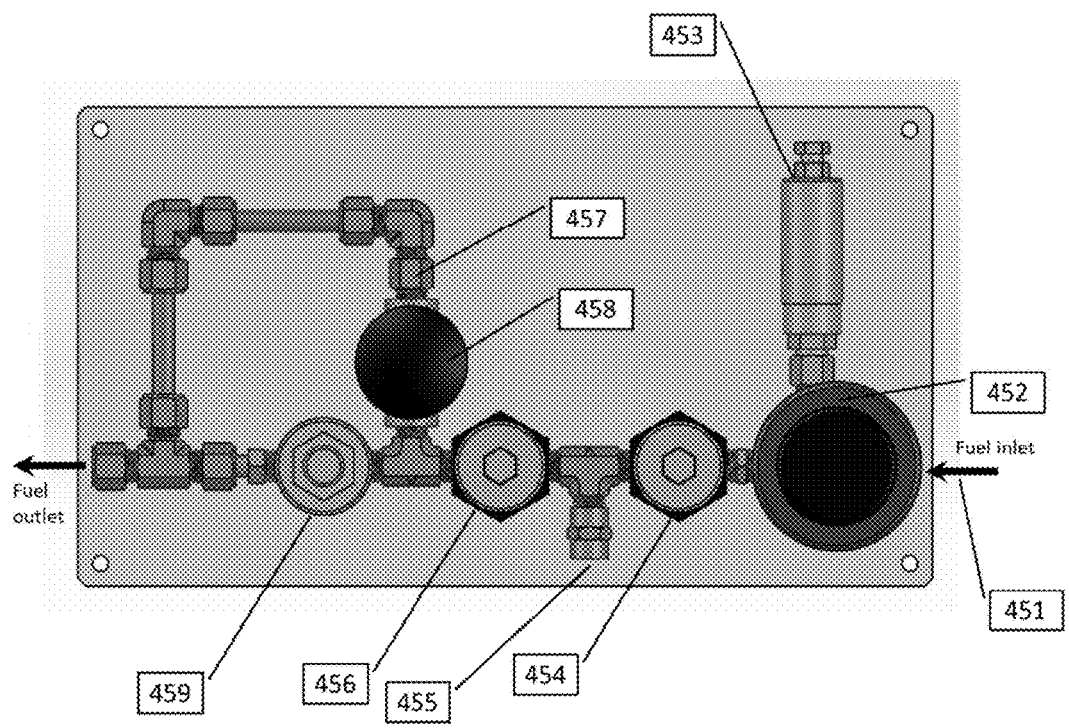
FIG. 17B shows a flow diagram of a non-limiting embodiment of the fuel system, including valves, regulators, and other plumbing hardware for one embodiment of an electromechanical flameless heater.

FIG. 17B shows another possible fuel manifold diagram for the electromechanical gas turbine heater. The fuel manifold has a fuel inlet (451), and the fuel pressure is first reduced by a pressure regulator (452). The pressure leaving the pressure regulator is measured by a pressure transducer (453). The fuel then passes through a main fuel shutoff valve (454), which can be configured to open to allow fuel flow, or configured to close to shut fuel flow. At this point, the fuel is split between the generator and the gas turbine engine. The fuel going to the generator leaves the fuel manifold through the outlet to the generator (455). The fuel then passes through a gas turbine shutoff valve (456), which can be configured to open to allow fuel flow into the combustion chamber of the gas turbine engine, or configured to close to shut fuel flow into the combustion chamber. At this point, the fuel flow is split into two paths. The first path allows sufficient fuel to flow into the combustion chamber during an ignition event, and the path includes an ignition fuel orifice (457) and an ignition fuel control valve (458). The orifice (457) limits the amount of fuel that can flow into the combustion chamber during an ignition event, and the ignition fuel control valve (458) allows finer adjustment of the amount of fuel allowed into the combustion chamber during an ignition event. The second path allows fuel to flow through the gas turbine fuel control valve (459), which provides additional fuel flow to reach idle and the desired operating point after ignition is achieved.

Having two separate paths for fuel flow allows the end user of the gas turbine heater to manually adjust the amount of fuel available for ignition after the heater is manufactured and the control software is programmed. This capability is useful when using different fuels for powering the gas turbine heater. If fuel energy content changes significantly when switching fuels, for example from propane to natural gas, the gas turbine engine may not achieve ignition without tuning one or more parts of the fuel manifold system. One way to tune the system is to change the control logic depending on the fuel type. However, the end user typically will not have access to and will not be able to change the control logic in the field. Therefore, having a mechanical adjustment is useful for further tuning in the field in case of changing ambient or input conditions. In this case, the end user of the gas turbine heater can manually adjust the ignition valve to allow sufficient fuel into the combustion chamber to reliably obtain ignition.

The pressure regulator is configured to reduce pressure of the incoming fuel to a pre-determined quantity. One reason for doing this is to ensure that the fuel pressure is within the operating pressure of the components in the fuel manifold, including fuel valves, pressure transducers, and pipes. Another reason for doing this is to obtain consistent fuel pressures each time the heater is used, such that gas turbine performance and the generator performance are also consistent each time the heater is used. Factors that are outside the design of the heater may affect system performance if a fuel pressure regulator is not built into the heater. Examples of outside factors include the particular location at which the heater is used, the fuel supply at the location at which the heater is used, and the ambient temperature. This fuel pressure setting may be configured mechanically by adjusting a control knob on the pressure regulator. This setting may also be configured electronically by way of a controller if the pressure regulator has a feature that allows the pressure to be set electronically. The fuel pressure setting can be varied depending on the ambient conditions and the particular application. The fuel pressure setting can also be varied during heater operation.

In the case of switching fuels, the end user of the gas turbine heater can manually adjust the pressure regulator setting to further tune the fuel manifold to reliably achieve ignition. In the same case, the end user of the gas turbine heater can also manually adjust the pressure regulator setting to achieve the same gas turbine performance, including compressor outlet pressure, turbine inlet temperature, and turbine exit temperature, even if the energy content of the fuel changes. As an example, when switching from propane to natural gas, the energy content of natural gas is lower than that of propane, so a higher pressure is required at the fuel inlet to cause the same amount of fuel, as measured by energy content (e.g. BTU), to enter the combustion chamber.

The gas turbine fuel control valve (459) may be an electronically controlled fuel valve, and the control signal may be sent to the gas turbine fuel control valve from a controller. In the case of electronic control, the controller may measure engine performance metrics to determine the appropriate amount of fuel to flow into the combustion chamber. Engine performance metrics may include compressor inlet pressure, compressor inlet temperature, compressor outlet pressure, compressor outlet temperature, turbine inlet pressure, turbine inlet temperature, turbine exit pressure, turbine exit temperature, fuel inlet pressure, and gas turbine rotation speed.

Figure 18:
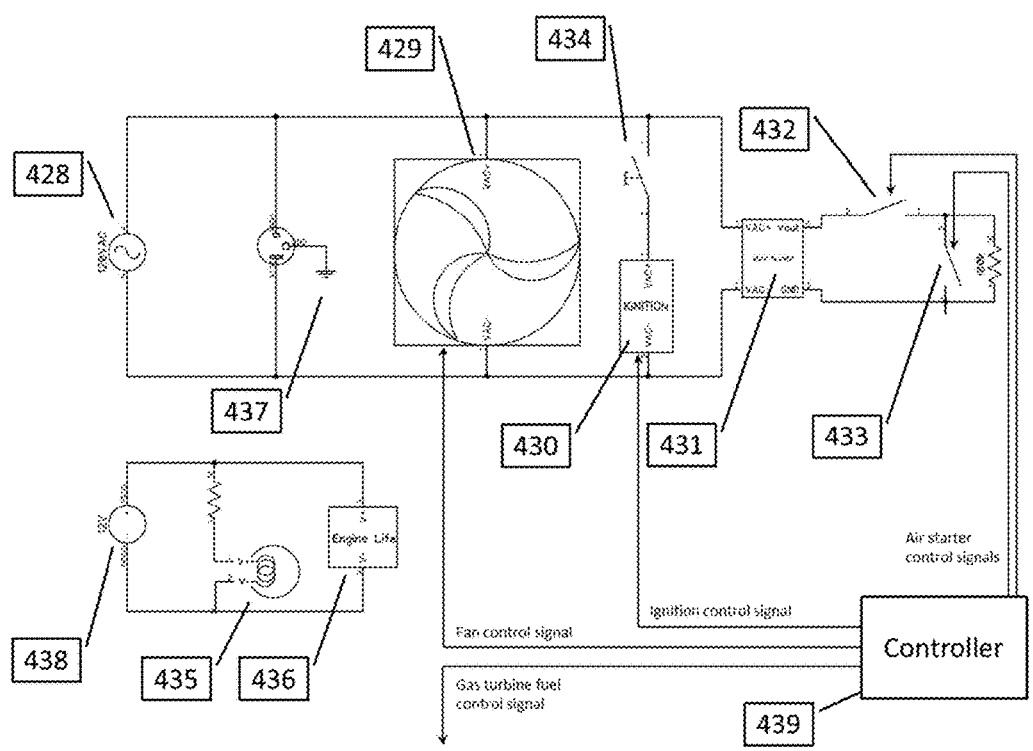
FIG. 18 shows a non-limiting embodiment of a wiring diagram of the electrical system, including switches, electrical equipment, indicators, and enclosure ground for one embodiment of an electromechanical flameless heater.

FIG. 18 shows one possible electrical wiring diagram for an electromechanical gas turbine flameless heater. The electrical system connects the pieces of electrical equipment in parallel to the generator AC electrical output (428). The pieces of electrical equipment include a fan (429), a gas turbine igniter (430), and a gas turbine starter (431). If the power requirement (such as voltage requirement, AC output, and DC output) of any equipment does not match the electrical output of the generator, then the appropriate converters (such as power supplies, voltage dividers, or voltage regulators) may be added in the electrical system. The electrical system also includes switches for the electrical equipment, such that different pieces of equipment can be turned on and shut off at different times in accordance with the startup and shutdown sequence. In one embodiment, the starter on/off switch (432) turns the starter on and off, and the starter low/high switch (433) applies two different power levels to the starter. The low setting allows enough air flow for ignition without quenching the combustion process, and the high setting allows enough air flow for the gas turbine to reach self-sustaining operation. For ignition, one type of switch is a momentary ignition switch (434) that provides power through the igniter when the operator holds the switch in the activated position, and turns off the switch when ignition is obtained and the combustion reaction is sustained. For added safety, solenoid valves may be included in the fuel line such that the solenoids close during a fault or when the generator shuts down. The generator may also power indicators. A generator power indicator (435) may be a light-emitting diode that is powered by the generator to indicate to the flameless heater operator that the generator is operational and producing power. An engine hour meter (436) may also be powered by the generator to indicate to the operator for how long the heater system has been in operation over its entire lifetime. For electrical grounding, the generator is grounded to a ground pole (437) located on the enclosure. Consequently, all pieces of electrical equipment are grounded to the same pole, and the igniter (430) is grounded to the outer wall of the combustion chamber (409), which is connected to the enclosure. Lastly, some generators may have both an AC electrical power output and a DC electrical power output (438).

In another embodiment, the gas turbine heater may include a controller 439 that receives input signals indicative of engine performance metrics, and also generates output signals that control various components of the gas turbine heater, including but not limited to the air starter, the fan, the electric generator, and the fuel valves. For example, the controller can receive input signals from the turbine inlet temperature sensors and the gas turbine RPM sensors to determine the operating point of the gas turbine engine. In case the turbine inlet temperature is greater than a certain limit, above which the gas turbine engine no longer operates safely, the controller may generate an output signal to shut off the fuel valve and shut down the gas turbine engine. For another example, the controller can generate an output signal to turn on the air starter during gas turbine startup, and then generate an output signal to open the fuel shutoff valves and the ignition orifice valve to allow fuel into the combustion chamber, and then generate an output signal to power the spark igniter such that combustion can be achieved. Without exhaustively listing out all possible types of input and control signals, it is understood that the controller can receive input signals from other components in the gas turbine heater, and supply control signals to other components in the gas turbine heater.

Modular Gas Turbine Engine

Aspects of the present disclosure also relate to recognition that a more modular design of gas turbines that allows the removal of individual subsystems in the field, would allow for ease of maintenance and reduced downtime, a highly valued. Aspects of the present disclosure also relate to recognition that, with traditional gas turbine engines, each engine is often specifically designed for a particular operating point, which is defined by power output, pressure, temperature, and ambient conditions. Consequently, one engine that is designed specifically for one application cannot be easily adapted for a different application, which makes gas turbine engines difficult to deploy as robust power generating systems, especially for applications in environments that are not tightly controlled or environments where the power need varies over the course of the engine's life.

One such application is power generation (e.g., primary power generation) at oil and gas wells. The upstream oil and gas industry stands to benefit from robust and reliable power generation devices for powering onsite machinery, including drilling equipment and supporting systems. Traditional power generation systems are built around reciprocating engines that are typically powered by natural gas or by diesel fuel. Aspects of this disclosure relate to a gas turbine engines that provide alternative power source at oil and gas wells. In some embodiment, the systems have fewer moving parts that result in higher reliability, and have higher power density resulting in a more compact package that is easier to transport and install on the field. In addition, gas turbine engines provided herein can be more fuel flexible because their combustion process occurs in a separate physical component from compression and expansion, whereas for reciprocating engines the compression, combustion, and expansion all occur inside the same cylinders. This fuel flexibility allows gas turbines to be a more robust power generation system.

Aspects of the present disclosure relate to methods of design and assembly of gas turbine engines. In some embodiments, gas turbine engines are provided that comprise (or consists of): radial compressor(s) and turbine(s), combustion chamber, electric motor/generator(s), and system chassis/housing.

Figure 19:
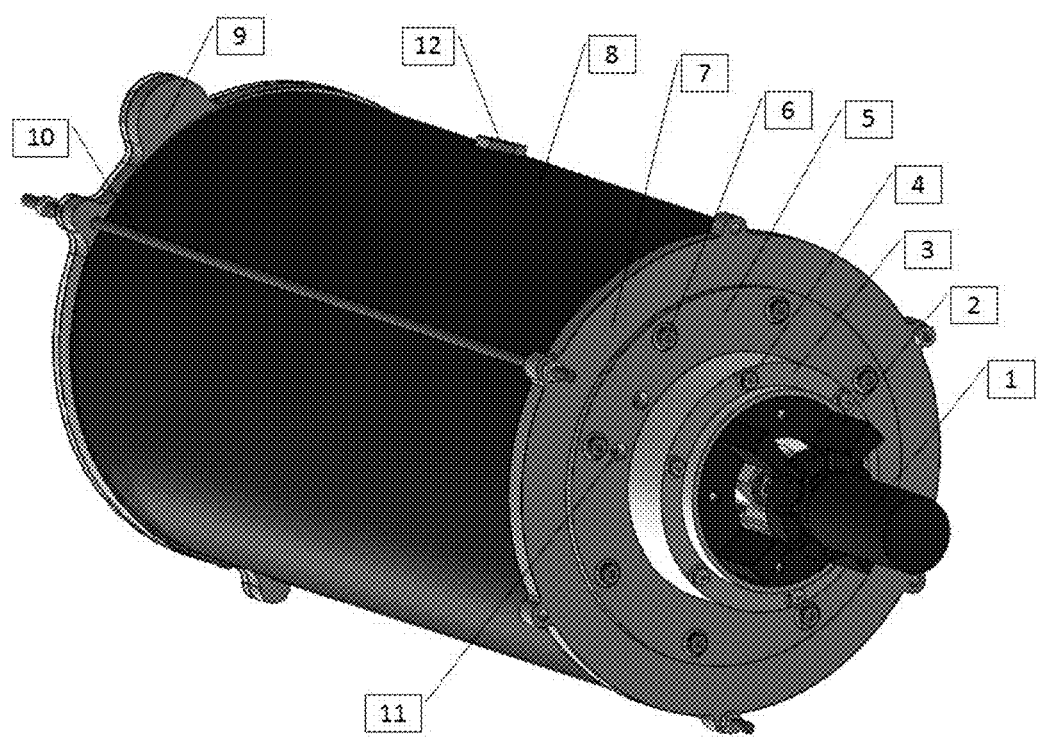
FIG. 19 shows a non-limiting embodiment of a fully assembled microturbine engine.

FIG. 19 shows a non-limiting embodiment of a fully assembled gas turbine engine. The starter motor (1) is mounted on the motor support structure (2). The motor support structure (2) is mounted on the bearing carrier (3), which is a structure that houses the shaft bearings. The bearing carrier (3) is attached to the compressor lid (5), which is adjacent to the compressor blades of the rotor and separated from the tips of the compressor blades by a thin gap of nominally 5% of the compressor blade height to provide clearance between the rotating compressor blade and the static compressor lid. The bearing carrier (3) is attached to the compressor lid (5) by a set of fasteners. In this embodiment, the fasteners are standard bolts (4). Any component of the gas turbine engine may have features that allow sensors to be attached to monitor system performance. In this embodiment, the compressor lid (5) contains two holes (11), through which a temperature and pressure sensor can be mounted to monitor flow temperature and pressure after the compressor. The compressor lid (5) is attached to the diffuser plate (7), which is also a non-rotating structure, using a set of fasteners (6). The diffuser plate also serves as one of the end walls of the combustor, which is also a non-rotating structure. The combustor is a chamber that is enclosed by the combustor shell (8), which is a cylindrical pressure vessel, and surrounded on one side of the combustor shell by the diffuser plate (7) and on the other side of the combustor shell by the fuel plate (9), from which fuel can flow into the combustor to be ignited. The ignition source is secured onto the combustor shell through the igniter mount (12). In this embodiment, the ignition source is a glow plug that can be threaded into the igniter mount to locate the tip of the igniter near the central axis of the combustor. The combustor is secured together by threaded rods (10).

In some embodiments, components of gas turbines are designed such that they are simple to assemble and disassemble. In some embodiments, components designed to be used in a modular fashion such that they are easily exchanged with identical or similar components. This allows for multiple combinations of components to be implemented in the same system chassis without any additional hardware or modifications being required for proper operation. For example, each component may have flat top/bottom faces on which the surrounding components are stacked. Components may be arranged in a linear fashion, concentric about the axis of rotation and are stacked sequentially.

Figure 20:
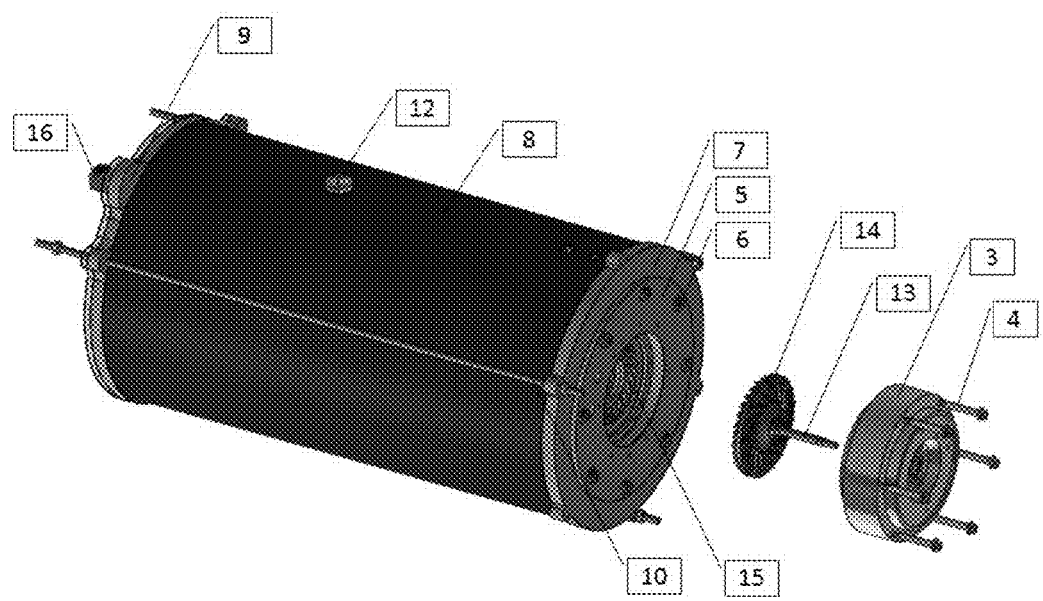
FIG. 20 illustrates a non-limiting embodiment of the manner in which the bearing housing and all of the rotating components of a turbo-machine subsystem, either a compressor or a turbine, can be removed in one step while the rest of the system remains assembled.

In some embodiments, a key item in a gas turbine system is a module which allows for the rotating components to be removed independent of the rest of the system. In some embodiments, this component is the outer most component of the system which houses the rotor, shaft, and bearings. For example, this component can be removed from the system by simply removing the fasteners securing it to the next layer, which remains secured to the system assembly as can be seen in FIG. 20. This quick release design is advantageous because it allows for quick and easy maintenance and replacement.

FIG. 20 illustrates a non-limiting embodiment of the manner in which the bearing housing and all of the rotating components of a turbo-machine subsystem, either a compressor or a turbine, can be removed in one step while the rest of the system remains assembled. In this embodiment, the bearing carrier (3) is first removed from the compressor lid (5) by undoing the bearing carrier fasteners (4) that connect (3) and (5) together. This step removes the bearing carrier (3), motor mount (2, shown in FIG. 19), generator (1, shown in FIG. 19), rotor (14), shaft (13), and bearings (not shown in FIG. 20). Removing the rotating components of a turbo-machine subsystem exposes additional non-rotating components within the gas turbine engine. In this embodiment, removing rotating components of a turbo-machine subsystem exposes a nozzle guide vane plate (15), which turns hot pressurized gas leaving the combustor to increase gas velocity before the gas enters a set of turbine blades.

Figure 21:
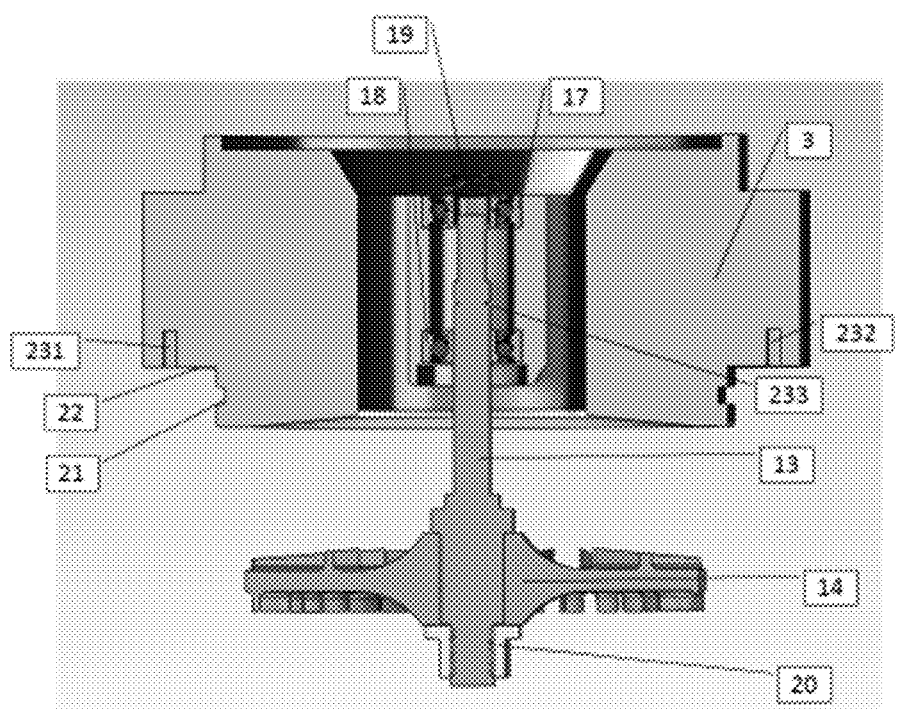
FIG. 21 shows a non-limiting embodiment in which bearings are preloaded at the inner race and press fit into the housing at the outer race, and the rotor and shaft can be removed from the rest of the turbo-machine subsystem in one step such that they can be easily repaired or replaced.

In some embodiments, a bearing assembly is provided which may be designed in at least two different ways. Certain embodiments presented in the present disclosure use pairs of angular contact bearings separated by a specified distance in order to resist bending moment in the rotating assembly. In one embodiment, the bearings are pressed into the housing at the outer race, the shaft is slid through the bearing inner race, and the preload is applied at the inner race. This allows the rotor and shaft to be quickly removed from the bearing housing, as shown in FIG. 21. In another embodiment, the bearings are pressed onto the shaft at the inner race, the bearings, rotor, and shaft are slid into the housing, and the preload is applied at the outer race. This allows the rotor, shaft, and bearings to be quickly removed from the bearing housing, as shown in FIG. 22.

FIG. 21 shows a non-limiting embodiment in which bearings are preloaded at the inner race and press fit into the housing at the outer race, and the rotor and shaft can be removed from the rest of the turbo-machine subsystem in one step such that they can be easily repaired or replaced. FIG. 21 shows a cross section of the bearing housing and rotating components. The rotor (14) and shaft (13) are pressed together and nominally not separable after assembly, and retained together by a retaining nut (20). The bearing housing houses an inboard bearing (18) and an outboard bearing (17). In this embodiment, the two bearings are a matched set of angular contact bearings, and may be preloaded using a preload compression spring (19), and located axially using a retaining fastener, for example a retaining ring, that fits over the retaining feature, for example a retaining ring groove (233). A retaining fastener may also be a retaining ring combined with a spring-loaded component to remove clearance between mating surfaces and reduce vibration between the mating surfaces. In this embodiment, the clearance between the shaft (13) and the inner races of the bearings may be specified as a light transitional fit or a light clearance fit, such that the shaft may be easily removed from the bearings. FIG. 21 also shows one method of aligning and sealing interfaces between the bearing carrier and the compressor lid. In this embodiment, the bearing carrier (3) contacts the compressor lid (5) over a flat annular interface (22). The cylindrical interface with the compressor lid (21) contains an O-ring groove, and an O-ring is slid over the groove to provide a seal such that the compressed gas coming out of the compressor does not leak through the interface (22) between the bearing carrier (3) and the compressor lid (5). The bearing carrier center line is aligned with the compressor lid center line using a set of two alignment features (231 and 232). In this embodiment, the alignment is achieved by dowel pins that are pressed into alignment features (231 and 232) on the bearing carrier and slide into corresponding alignment features on the compressor lid.

Figure 22:
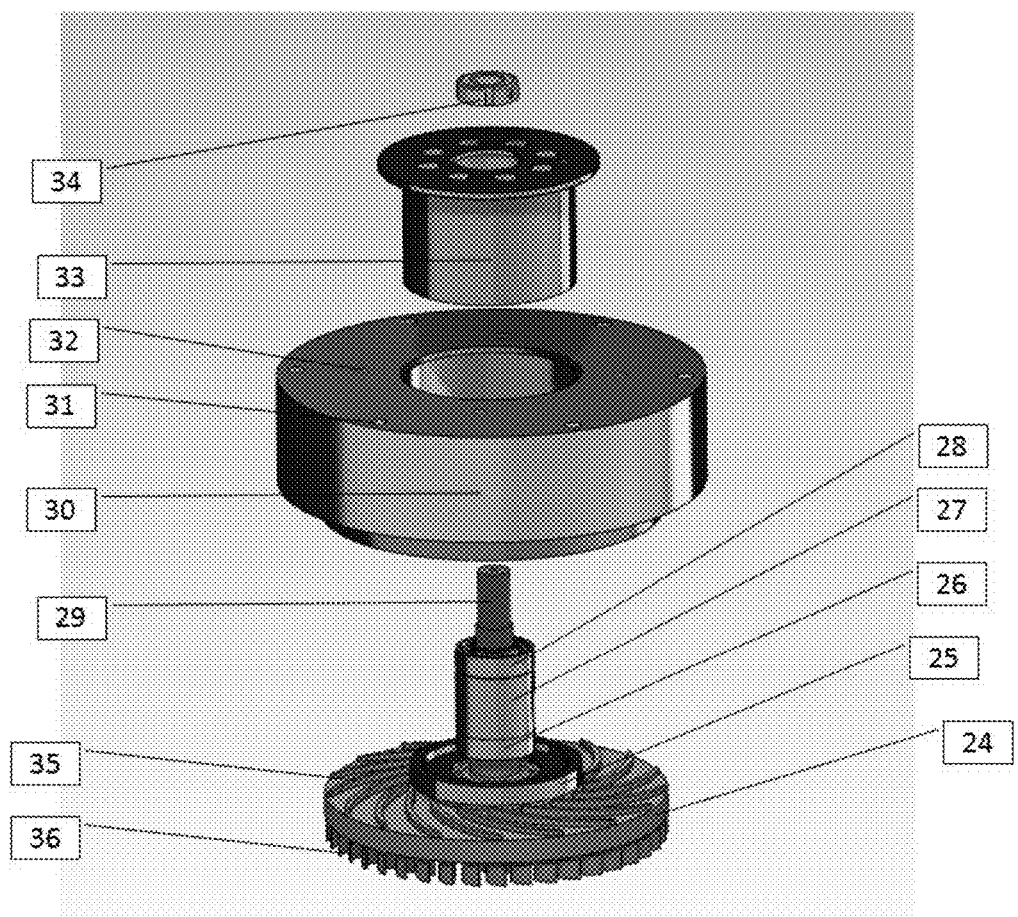
FIG. 22 shows a non-limiting embodiment in which bearings are preloaded at the outer race and press fit onto the shaft at the inner race, and the rotor, shaft, and bearings are removable from the rest of the turbo-machine subsystem in one step such that they can be easily repaired or replaced.

FIG. 22 shows a non-limiting embodiment in which bearings are preloaded at the outer race and press fit onto the shaft at the inner race, and the rotor, shaft, and bearings are removable from the rest of the turbo-machine subsystem in one step such that they can be easily repaired or replaced. In this embodiment, a shaft (29) is pressed into a rotor (24) using an interference fit such that the two components are nominally not separable after assembly. A bearing cartridge (33) is pressed into a bearing housing (30), and the bearing cartridge (33) houses the inboard bearing (26) and the outboard bearing (28). The two bearings are separated by a preload spacer (27) at the outer race, and the inner races are pressed onto the shaft (29). The inner diameter of the bearing cartridge (33) is designed such that it has either a light interference fit or a sliding fit with the outer races of the bearings. This allows all rotating components, including bearings, bearing spacer, rotor, and shaft, to be easily inserted into and removed from the bearing cartridge. The rotating components are axially located with the bearing cartridge and bearing housing by a bearing retaining nut (34). The bearing housing is attached to the rest of the engine using a set of fasteners. In this embodiment, the bearing housing is bolted to the rest of the engine using standard bolts through the bolt holes in the bearing housing (31).

In some embodiments, a gas turbine engine is designed to be quickly assembled, disassembled, and reassembled using simple fasteners, such as spring-loaded fasteners, bolts, screws, snaps, rivets, etc. As a result, the assembly process typically does not limit the material choice of the engine components, as opposed to more complicated micro-turbine manufacturing methods, such as silicon bonding for micro-turbomachinery. Each engine component may comprise any material, and engine components in the same subsystem may be different materials, as long as mechanical and thermal considerations are satisfied.

For the rotating and non-rotating components of the compressor or other components, examples of suitable materials include, but are not limited to, 1018 carbon steel, 4140 alloy steel, 4340 alloy steel, 6061 aluminum, 316 stainless steel, and other alloys of steel, stainless steel, and aluminum. For the rotating components of the turbine, examples of materials may be 4340 alloy steel, 718 Inconel, Hastelloy X, or other types of alloy steel and nickel alloys designed for operation at both high temperature and high mechanical stress. For the non-rotating components of the turbine, example of materials may be 1018 carbon steel, 4140 alloy steel, 4340 alloy steel, 316 stainless steel, 718 Inconel, Hastelloy X, or other types of alloy steel, stainless steel, and nickel alloys that can withstand high temperatures. For the combustor, the pressure vessel and liner materials may be 1018 carbon steel, 4140 alloy steel, 4340 alloy steel, 316 stainless steel, or other types of carbon steel, alloy steel, or stainless steel.

Figure 23:
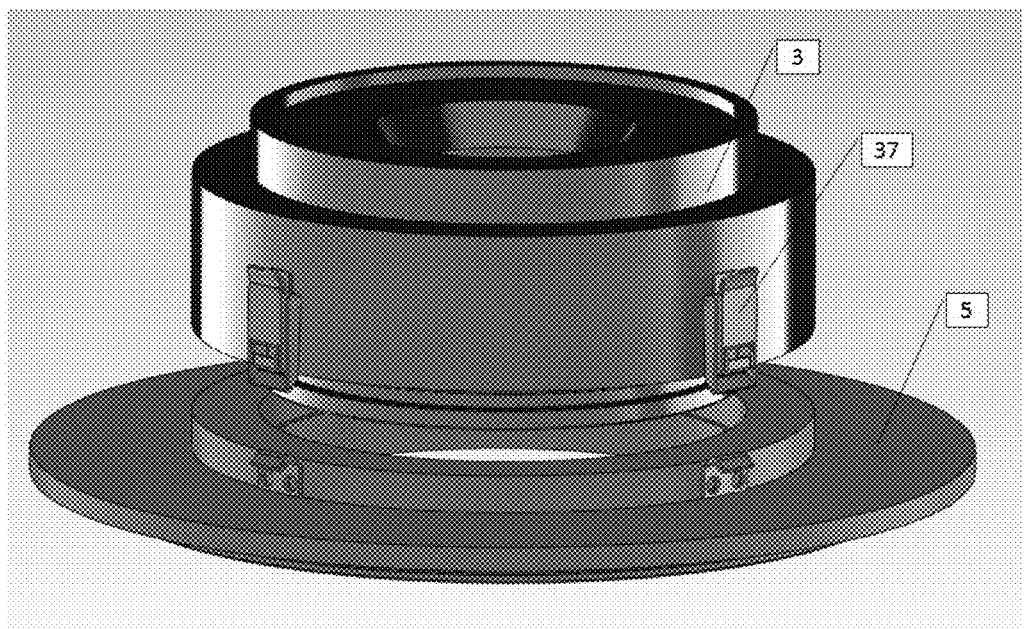
FIG. 23 shows a non-limiting embodiment of a method of fastening components of a subsystem using spring-loaded fasteners instead of bolts, such that the subsystem can be quickly assembled, disassembled, and reassembled.

One method of assembling the engine is using spring-loaded fasteners instead of bolts. The fasteners provide clamping force across the axial length of the subsystem, but may be applied and released quickly. FIG. 23 shows one embodiment of a subsystem in which spring-loaded fasteners are used to fasten the subsystem.

FIG. 23 shows a non-limiting embodiment of a method of fastening components of a subsystem using spring-loaded fasteners instead of bolts, such that the subsystem can be quickly assembled, disassembled, and reassembled. A bearing carrier (3) is attached to a compressor lid (5) using a set of draw latches (37) instead of a set of bolts (4). A draw latch can be fastened by pulling on the latch to tighten a spring that holds two surfaces together. Standard bolts are fastened by multiple turns of the bolt. The assembly and disassembly time is reduced when using a draw latch as compared to using standard bolts. The table below lists some of the possible fasteners and a commercially available source for each example of fastener. Other than standard bolts, other options are different types of quick-release fasteners that can be used to reduce assembly and disassembly time.

| Fastener Type | Commercial Source | Example Part# |
| --- | --- | --- |
| Standard bolts | McMaster | 91257A546 |
| Draw latches | McMaster | 4567A11 |

-continued

| Fastener Type | Commercial Source | Example Part# |
| --- | --- | --- |
| Quick release pins | McMaster | 90980A125 |
| Slotted quarter turn stud fasteners | Camloc | Camloc 50F |
| Squeeze release latches | Southco | 60-10-101-12 |

In some embodiments, to increase robustness of the gas turbine engine, the engine is designed with modular subsystems, such that the important subsystems may be easily swapped out. This allows easy maintenance and easy reconfiguration to a different power output using the same engine architecture. This also allows the use of other turbo-machine components.

Figure 24:
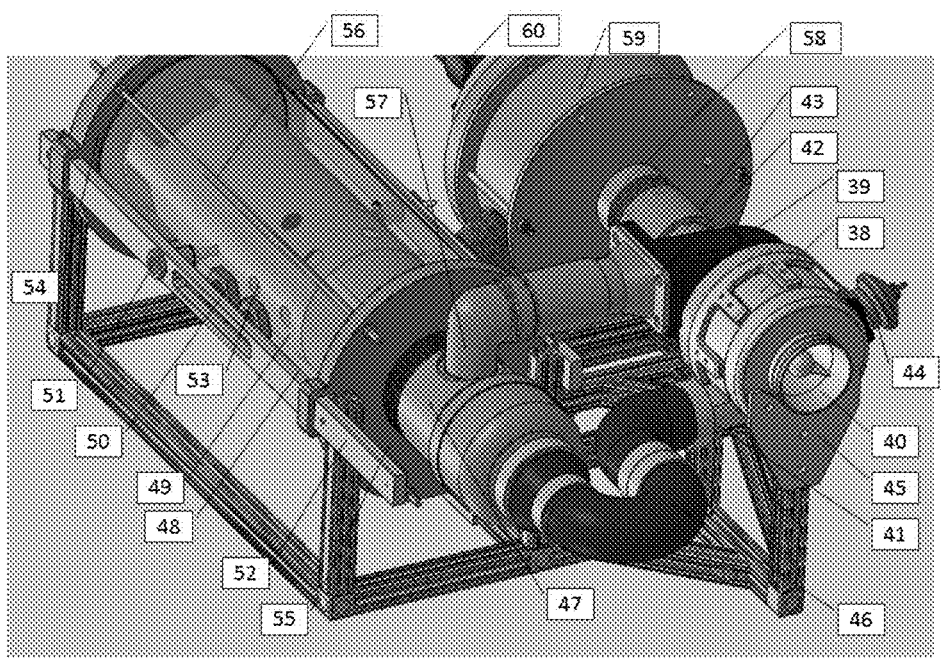
FIG. 24 shows a non-limiting embodiment of a series of micro gas turbine engines in which the core turbo-machine subsystem, a combustor, and a power turbine subsystem are connected together by a common interface, and any of the subsystems may be swapped out for a subsystem designed for a different power output, such that the power generation unit may be reconfigured for a different power output in the field.

FIG. 24 shows a non-limiting embodiment of a series of micro gas turbine engines in which the core turbo-machine subsystem, a combustor, and a power turbine subsystem are connected together by a common interface, and any of the subsystems may be swapped out for a subsystem designed for a different power output, such that the power generation unit may be reconfigured for a different power output in the field. In this embodiment, a compressor (38) has an inlet (40) and an outlet (41), and is supported by a frame (45). The compressor has a rotor with blades, and the blades rotate to impart energy upon air coming from the inlet to increase air pressure, and the compressed air flows through a flow path (46) that connects the compressor and the combustor. In this embodiment, the combustor is a cylindrical pressure vessel that comprises a cylindrical outer shell (48) and a cylindrical combustor liner (49), and the two cylindrical components are enclosed by a forward end plate (55) at one end and an aft end plate (54) at the other end. The combustor components are secured together by threaded rods (56). The compressed air enters the combustor at the combustor inlet (47), passes through the annulus formed by the outer shell (48) and the combustor liner (49), flows into the center of the liner and turns the flow direction 180 degrees before combusting with the fuel and leaving the combustor as hot pressurized gas through the combustor exit (57). The fuel enters through the aft end plate (54) and is mixed with the compressor air inside the combustor liner (49) before being ignited by the igniter (51). In this embodiment, the igniter is a glow plug that is radially located such that the tip of the igniter is near the center line of the combustor liner. In this embodiment, the combustor liner has dilution holes (53) such that some of the flow entering the combustor bypasses the igniter, and the remaining flow mixes with the fuel and is ignited, and the two mixtures combine together after the dilution holes. Also in this embodiment, the combustor outer shell (48) has viewing windows (50) built into the shell and aligned with the dilution holes such that the flame may be observed from outside the combustor. The hot pressurizes gas leaves the combustor and enters a first turbine (39). In this embodiment, the first turbine has an inlet (42) and an outlet (43). Inside the first turbine is a first turbine rotor with blades, and the rotor is mechanically coupled to the compressor rotor, and the hot pressurized gas imparts energy onto the blades of the first turbine rotor to provide energy to compress cold air from the compressor inlet. The hot pressurized gas then drops in pressure and temperature after imparting energy to the first turbine rotor before exiting the first turbine through the first turbine outlet (43) and entering the second turbine (59) through the second turbine inlet (58). The second turbine contains a second turbine rotor. The second turbine rotor contains blades, and the rotor is mechanically coupled to an electric generator (60). The hot pressurized gas coming into the second turbine through the inlet (58) imparts energy on the blades and spins the second turbine rotor, which then provides power to the generator. The generator then converts mechanical shaft power from the second turbine rotor to electric power.

In this embodiment of a gas turbine engine, an automobile turbocharger is used as the core turbo-machine, which includes the compressor (38) and the first turbine (39). The modular gas turbine engine uses a common placement of subsystems that are connected together by pipes at standard interfaces. In another embodiment, the automobile turbocharger may be sized for a larger power output, but may have the same interfaces for the compressor inlet (40), compressor outlet (41), first turbine inlet (42), and first turbine outlet (43), such that the automobile turbocharger with the larger power output may directly replace the automobile turbocharger with a smaller power output without changing the other components of the gas turbine engine, such as the combustor and the power turbine. In order for one set of flow paths to work for a variety of power outputs, the flow paths are designed for the largest flow rate in a series of gas turbine engines with a pre-determined range of power outputs. For smaller power outputs and therefore flow rates, the flow velocity will be smaller in the flow paths, which reduces the dynamic pressure and reduces pressure losses in the flow paths without having much negative effect on the aerodynamics performance. FIG. 25 shows one example of results from flow path sizing calculations that size pipes according to the largest expected flow rate for a particular line of engines.

Figure 26:
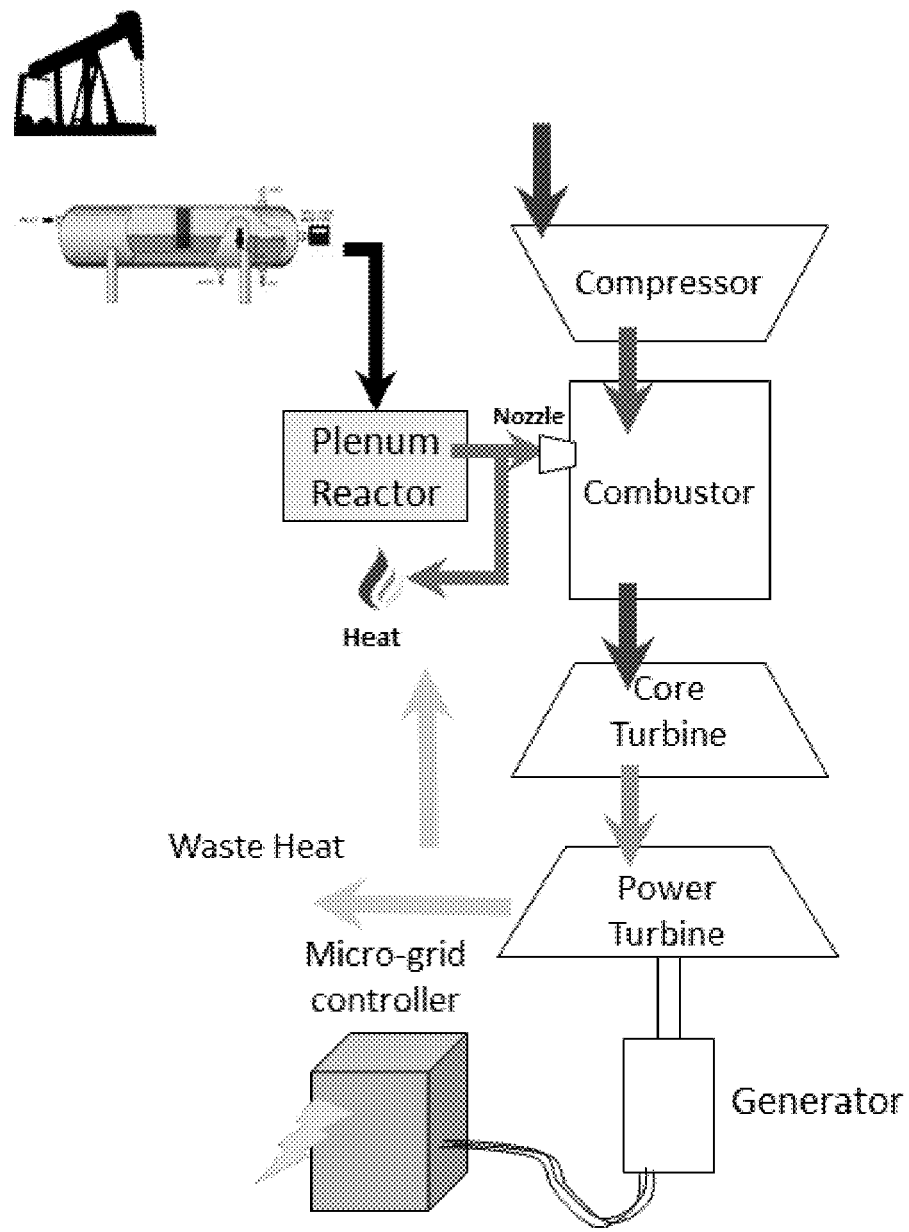
FIG. 26 shows a non-limiting embodiment of a schematic of a microturbine engine in the oil field; in this embodiment, a fuel system is connected to a high pressure separator and tan electrical output is connected to onsite equipment.

The gas turbine engine is a more robust engine that can be used effectively in a power generation unit for powering upstream equipment in the oil and gas industry. One embodiment of a power generation unit includes the gas turbine engine, a fuel capture and regulation system, and a power electronics system. The fuel capture system takes wellhead gas from the gas outlet of the high pressure two-phase or three-phase separator onsite, and controls the wellhead gas flow into the combustion chamber as fuel. The power electronics system converts high frequency power from the electrical generator into standard industrial power to power electric motors onsite. FIG. 26 shows one embodiment of this power generation unit.

Figure 27:
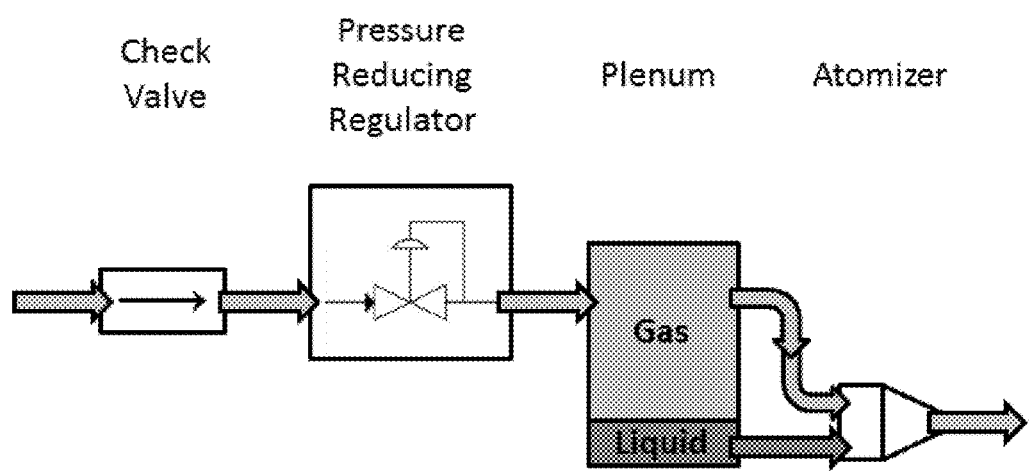
FIG. 27 shows a schematic of a non-limiting embodiment of a fuel capture system, having an inlet which is connected to a high pressure separator, and an outlet which is connected to a microturbine engine combustion system via an air-assist atomizer.

The fuel capture and regulation system supplies wellhead gas to the combustion chamber of the gas turbine engine as fuel. Wellhead gas contains a variety of hydrocarbons as well as non-combustible substances, resulting in a mix of gases and liquids that may enter the combustion chamber. One method of injecting this mixture is to use an air-assist atomizer. The air-assist atomizer typically operates by sending liquid fuel through the liquid flow path of the atomizer, and sending pressurized air through the gas path of the atomizer. In this case, the liquids from the wellhead gas may be fed into the liquid flow path of the air-assist atomizer, and the wellhead gas may be fed into the gas flow path. FIG. 27 shows one embodiment of this fuel injection system.

Figure 28:
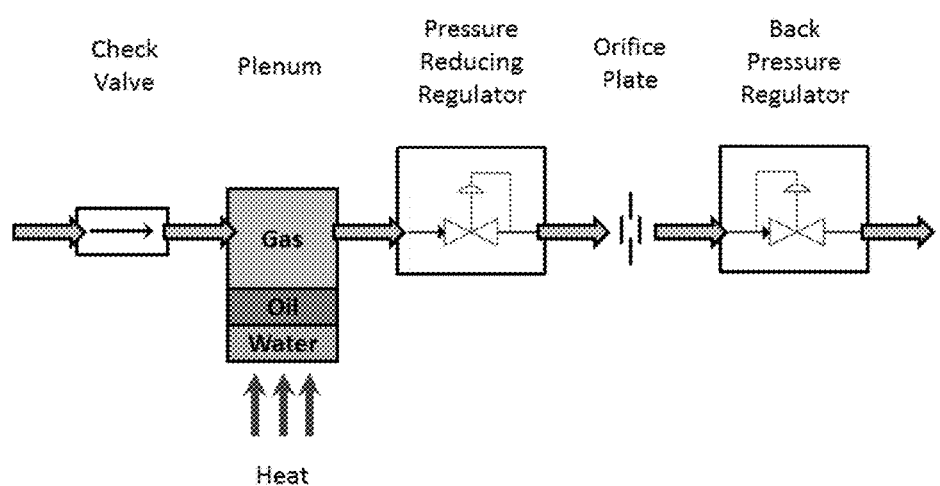
FIG. 28 shows a schematic of a non-limiting embodiment of a fuel capture system, having an inlet which is connected to a high pressure separator, and an outlet which is connected to a microturbine engine combustion system via a gas nozzle.

Another embodiment of the fuel capture and regulation system heats the wellhead gas using engine exhaust such that the wellhead gas mixture is superheated past saturation and minimizes the chances of the mixture condensing as it flows from the separator into the combustion chamber. The heating occurs in a plenum that stores wellhead gas and act as a buffer between the upstream separator and downstream combustion chamber such that small changes in separator output does not negatively impact combustion performance. The flow rate of the gas may be controlled using pressure regulators and valves. In one embodiment of the flow control system, the flow goes through a pressure regulator, a plenum, a valve, and an electronically controlled back pressure regulator. The pressure regulator and back pressure regulator control the pressure differential across the valve to control the flow rate. The back pressure regulator set point can be controlled based on engine performance, including power output, RPM, and flow temperature. For a fixed valve setting, this design can accommodate flow rates that are greater than or less than the nominal flow rate by 30%. FIG. 28 shows a schematic of this fuel system.

Figure 29:
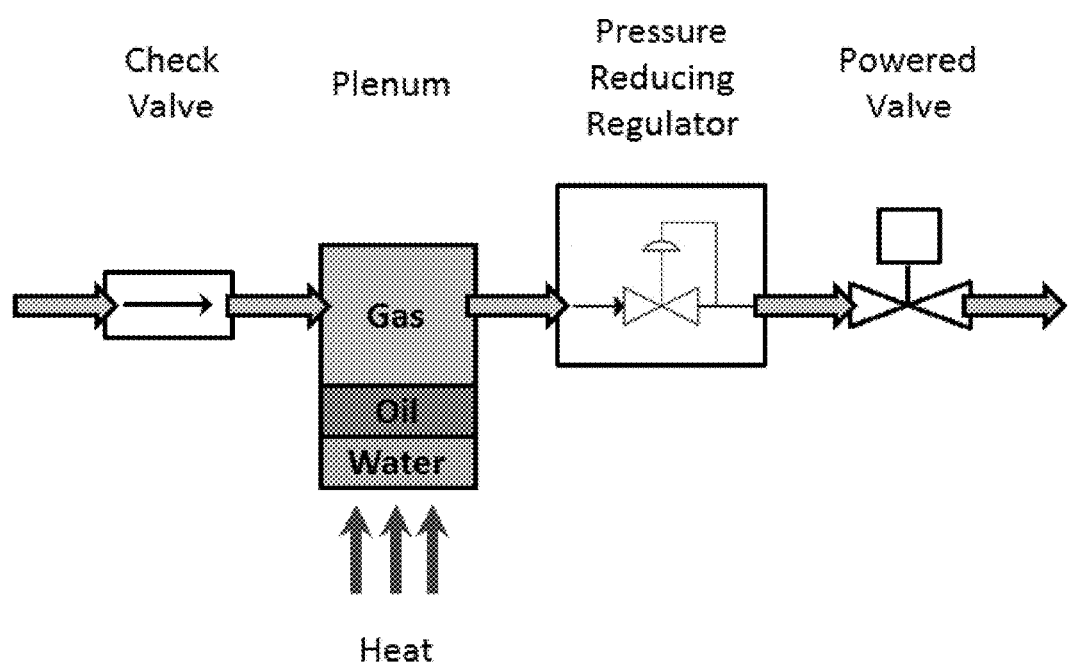
FIG. 29 shows a schematic of a non-limiting embodiment of a fuel capture system, having an inlet which is connected to a high pressure separator, and an outlet which is connected to a microturbine engine combustion system via a gas nozzle.

Another embodiment of a flow control system forces the wellhead gas to flow through a pressure regulator, a plenum, and an electronically controlled valve. The pressure regulator controls the plenum pressure at a high enough set point such that the flow across the valve is choked. The valve setting can then be controlled based on engine performance to control the flow rate. This design can accommodate a full range of flow rates from 0% to 100% of the nominal flow rate. FIG. 29 shows a schematic of this fuel system.

Figure 30:
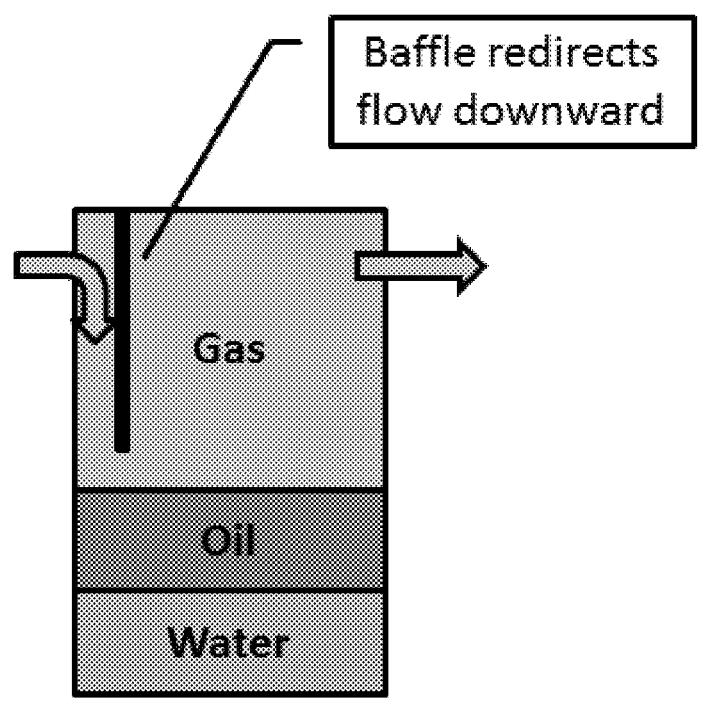
FIG. 30 shows a schematic of a non-limiting embodiment of a plenum of a fuel capture system, in which the plenum acts as a slug catcher using a series of baffles to reduce the amount of liquid entering the combustion chamber of the microturbine engine.

For either of the two aforementioned fuel systems, the amount of liquid flowing through the valve may be reduced by adding baffles in the plenum such that the plenum also operates as a slug catcher. FIG. 30 shows a schematic of this plenum design.

Figure 31:
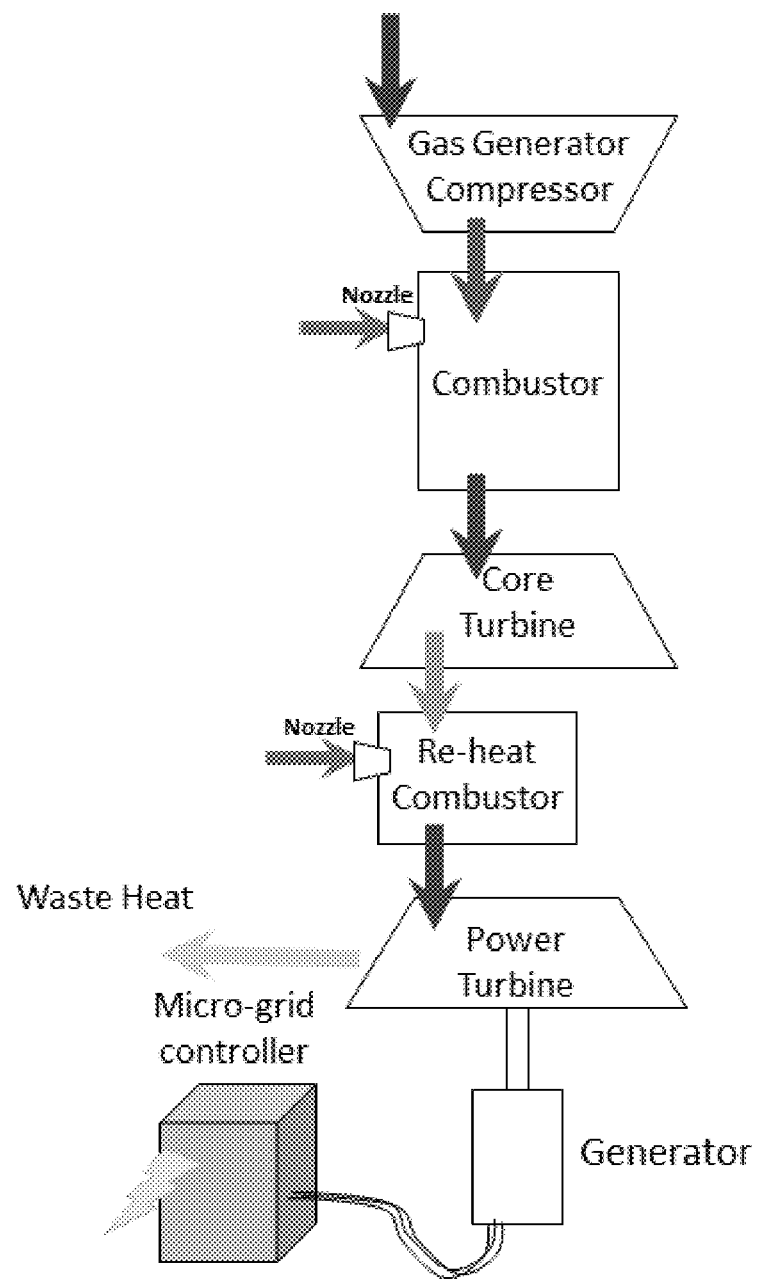
FIG. 31 shows a schematic of a non-limiting embodiment of a power generation unit containing a microturbine engine and an afterburner in between the core turbine and power turbine subsystems, and the afterburner combusts additional wellhead gas to increase the power output of the engine and reduces the amount of wellhead gas that the flare or thermal oxidizer system must burn.
Figure 32:
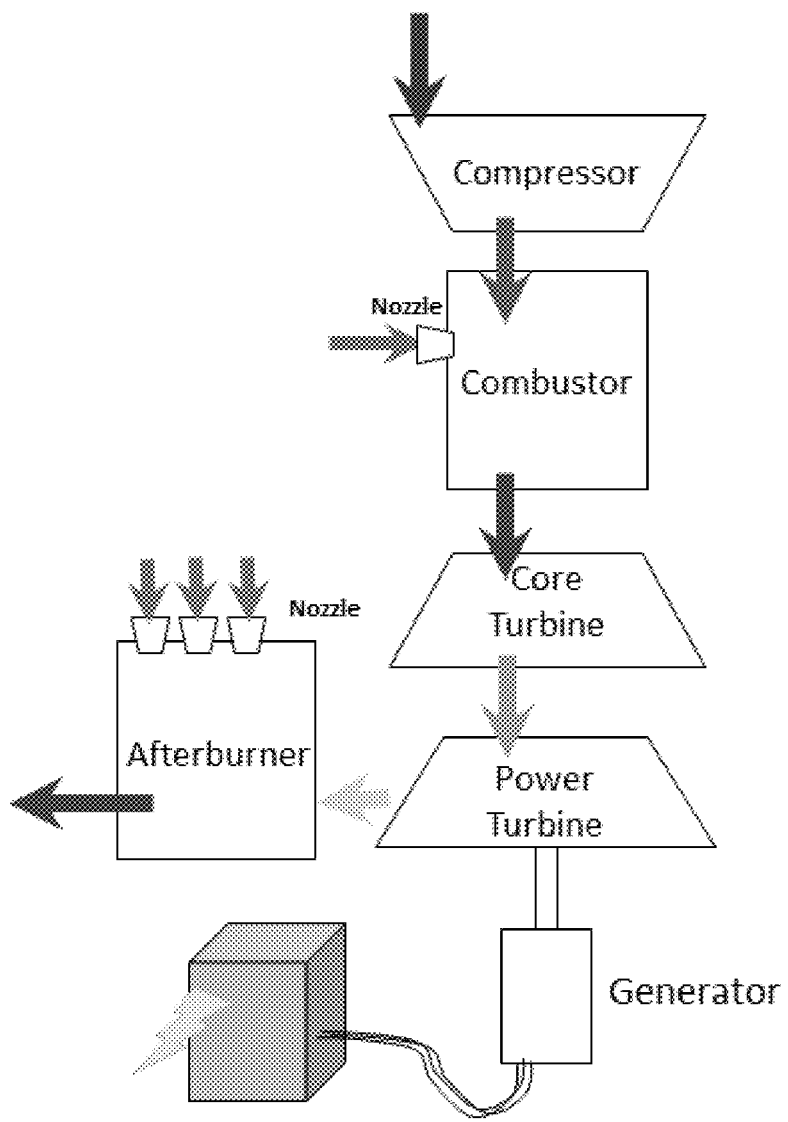
FIG. 32 shows a schematic of a non-limiting embodiment of a power generation unit containing a microturbine engine and an afterburner in between the power turbine subsystem and the engine exhaust, and the afterburner combusts additional wellhead gas to reduce the amount of wellhead gas that the flare or thermal oxidizer system must burn.

The gas turbine power generation unit described above uses wellhead gas as fuel. In addition, the system may burn additional wellhead gas in an afterburner module instead of sending the gas to be burned in a flare system or a thermal oxidizer. By mixing the wellhead gas with the gas turbine engine flow and combusting the gas in an afterburner, the emissions will be lower than burning the gas in a flare or thermal oxidizer. In one embodiment of this system, an afterburner is placed between the core turbine and the power turbine, such that in addition to burning more wellhead gas, more power can be extracted from the power turbine. FIG. 31 shows a schematic of this system. In a derivative embodiment, a controlled, pressurized air flow from a compressor is mixed with the exhaust of the core turbine, prior to the after burner to allow for the combustion of more flare gas. In another embodiment of this system, an afterburner is placed after the power turbine, such that the afterburner is used exclusively to burn additional wellhead gas, and effectively replaces the flare system or the thermal oxidizer system. FIG. 32 shows a schematic of this system. In a derivate embodiment, additional controlled air is provided by one or more compressors to increase airflow thereby allowing for more flare gas combustion or more finely controlled flare gas combustion. In another embodiment, the afterburner is in fluidic contact with one or more compressors but is not in direct fluidic contact with exhaust flow from the power turbine.

Figure 33:
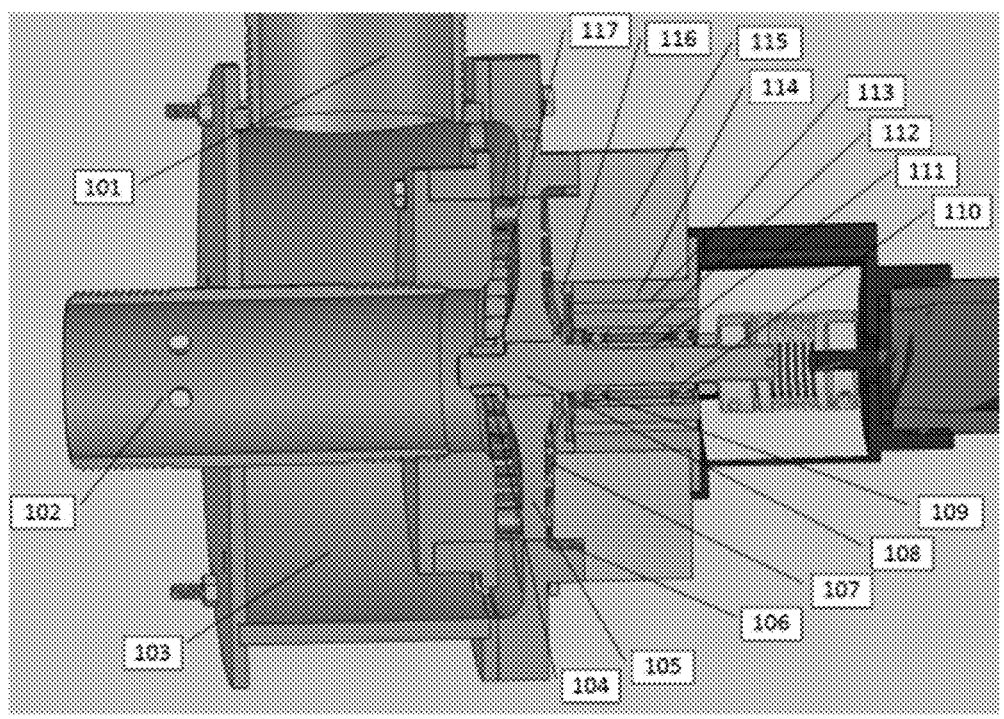
FIG. 33 shows a schematic of a non-limiting embodiment of a power turbine subsystem having a flow path designed to minimize heat transfer from the hot gases to the bearings and to minimize heat transfer out of the power turbine inlet flow, and also having a cooling system design in which cooling blades are placed on the power turbine rotor to draw cooling flow across the power turbine rotor; in this embodiment, the cooling flow may also be routed through the bearing passages to provide cooling.
Figure 34:
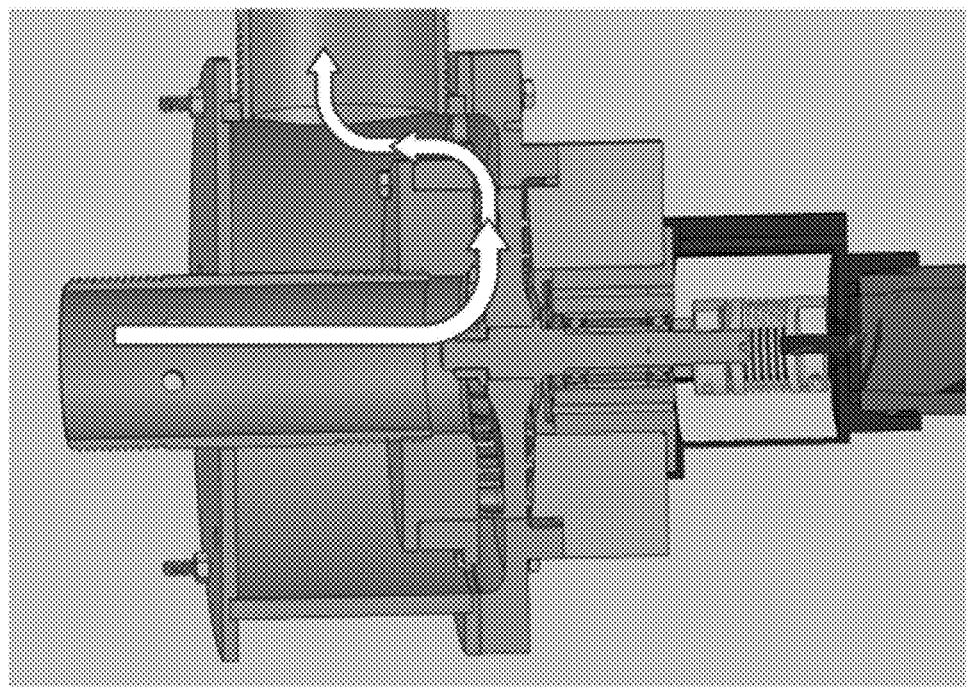
FIG. 34 shows a schematic of a non-limiting embodiment of a power turbine subsystem, with the flow path designed to minimize heat transfer from the hot gases to the bearings and to minimize heat transfer out of the power turbine inlet flow.
Figure 35:
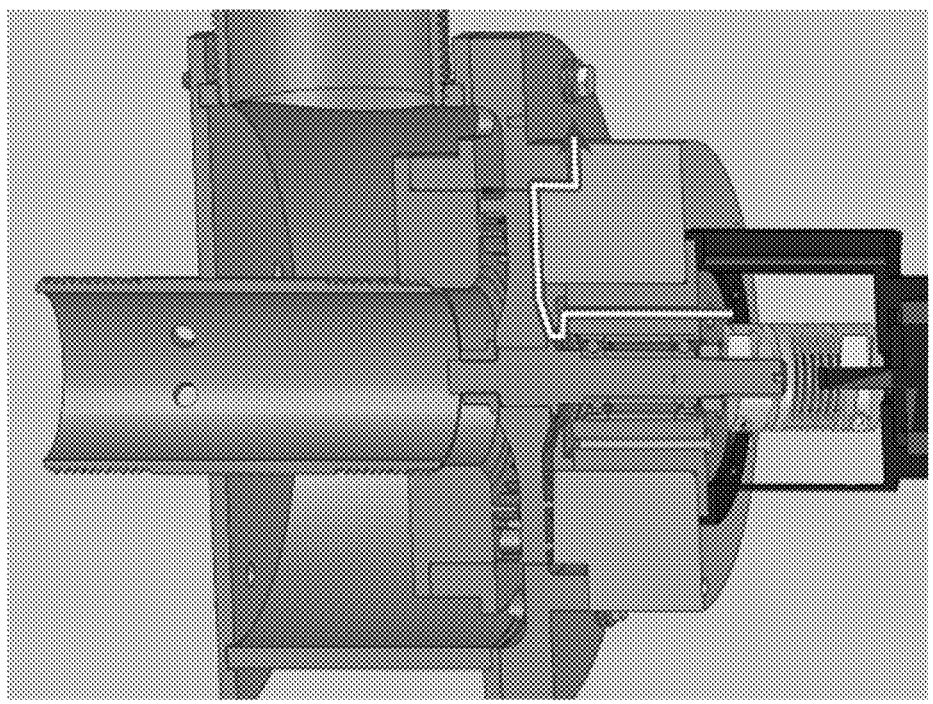
FIG. 35 shows a schematic of a non-limiting embodiment of a power turbine subsystem, with a flow path designed to cool the power turbine rotor, shaft, and bearings.

FIG. 33 shows a schematic of a power turbine. The power turbine has a shaft (108) attached to a rotor (105), and secured by a retaining nut (104). The power turbine rotor has rotor blades (117) that extract shaft power from hot gases coming from the power turbine inlet (102), which receives hot gases from the core turbine outlet. The power turbine exhaust leaves the rotor blades (117) and enters the exhaust plenum (103), and then leaves the power turbine through the gas turbine engine exhaust (101). In one embodiment described by FIG. 33, the power turbine is supported by two angular contact bearings. The inboard bearing (109) is located closer to the rotor, and the outboard bearing (110) is located farther from the rotor. The bearings are axially located relative to each other by an inner race spacer (111) and an outer race spacer (112). The bearings are housed in a bearing housing (114), and the bearing housing is housed in an outer housing (115). The power turbine subsystem is designed to minimize heat transfer from hot gases into the bearing system, and also designed to minimize heat loss from the flow at the power turbine inlet to the surroundings. These are accomplished by routing the power turbine exhaust flow in the direction toward the inlet and into an exhaust plenum, before exiting the power turbine subsystem. The bearing assembly in this design is located on the side of the rotor opposite the power turbine rotor blades. The exhaust plenum (103) surrounds the power turbine inlet pipe (102), and reduces the loss of heat from the power turbine inlet pipe (102) compared to exposing the inlet pipe to ambient air. In order to further reduce the power turbine bearing temperatures, a passive cooling system is designed into the power turbine subsystem. This is accomplished by building cooling blades (107) on the back of the power turbine rotor opposite the power turbine rotor blades (117). The cooling blades (107) effectively act as a compressor that draws in cold air from the ambient to flow through the cooling passages (113). The cooling passages (113) are routed through the power turbine subsystem to provide convective cooling to the bearing assembly. A flow diverter plate (116) may also be added to direct more of the cooling air toward the shaft (108) and the inboard bearing (109). FIG. 34 shows a schematic of a power turbine, with an arrow showing the hot gas flow path being directed away from the bearings. FIG. 35 shows a schematic of the same power turbine, with an arrow showing the cooling flow path being directed near the bearings, the shaft, and across the cooling blades.

Figure 36:
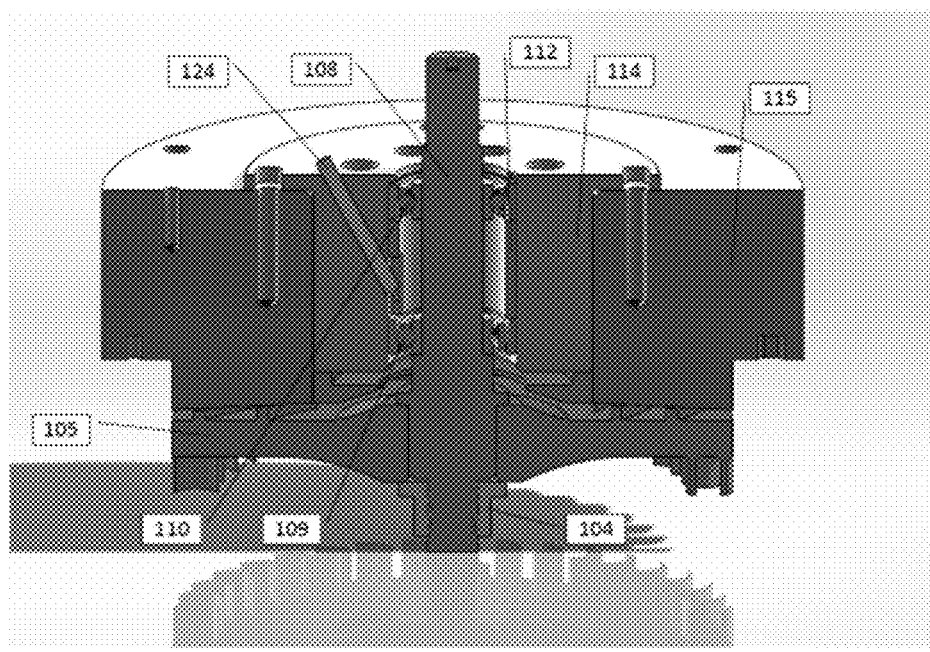
FIG. 36 shows a non-limiting embodiment of a lubrication system design for a power turbine subsystem, in which a lubrication passage is machined into a bearing housing, and the lubrication nozzle is inserted into the bearing housing.
Figure 37:
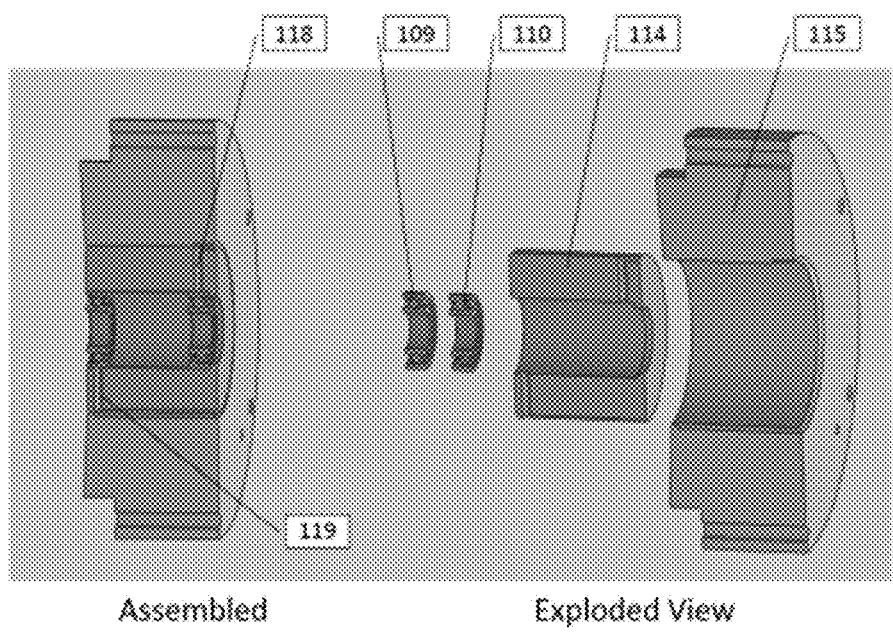
FIG. 37 shows a non-limiting embodiment of a lubrication system design for a power turbine subsystem, in which the lubrication passages are machined into a two-part bearing housing, such that the passages may be machined using simple manufacturing methods, and then the two parts of the bearing housing are combined to form a complete lubrication passage; in this embodiment, the machining process for the cooling passages may be combined with the process for the lubrication passages.

Another method of reducing bearing temperature and extending bearing life is to incorporate a lubrication system. One embodiment of a lubrication system uses a solenoid pump to periodically pump lubricant through the lubrication passage and into the bearing through the bearing outer race. FIG. 37 shows a schematic of a two-part bearing housing and integral lubrication passages. The lubrication passage may be manufactured using simple manufacturing techniques by building a portion of the lubrication passage in both the bearing housing (114) and the outer housing (115), and forming complete lubrication passages when the two bearing housing parts are combined together. FIG. 37 shows both an exploded view and a combined view of a bearing assembly, and an inboard bearing lubrication passage (119) and an outboard bearing lubrication passage (118) are both shown. The assembled view shows that the lubrication passage is formed by cutouts in both the bearing housing (114) and the outer housing (115). FIG. 36 shows another embodiment of a lubrication system, wherein a lubrication passage is machined into the bearing housing, and a lubrication nozzle (124) is inserted into the lubrication passage to deliver lubricant to the bearing. Only the inboard bearing requires a lubrication passage because the outboard bearing is facing the ambient, so a lubrication nozzle may be placed near the outboard bearing to directly deliver lubricant to the outboard bearing.

The rotating subassembly in the power turbine, including the shaft, rotor, retaining nut, bearings, and spacers, may be designed to the configuration that is illustrated in FIG. 21 or FIG. 22 and is described in this disclosure, such that the rotating subassembly can be easily removed from the outer housing.

Figure 38:
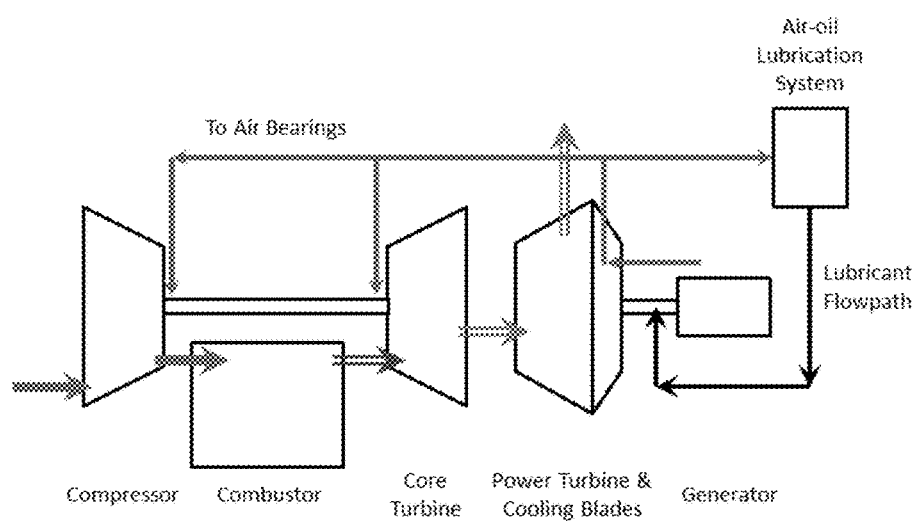
FIG. 38 shows a schematic of a non-limiting embodiment of a power generation unit having a power turbine subsystem configured to generate pressurized air for cooling, in which the pressurized air may be routed to other subsystems in the power generation unit that may require compressed air, including but not limited to air bearings and air-oil lubrication systems.

The cooling system design can be further put to use by routing the pressurized air to different subsystems within the power generation unit that may need pressurized air. For example, the pressurized cooling flow may be used to power air bearings for the gas turbine, or to supply motive air for an air-oil lubrication system. FIG. 38 shows a schematic of how the pressurized air may be routed to different subsystems of the power generation unit.

Figure 39:
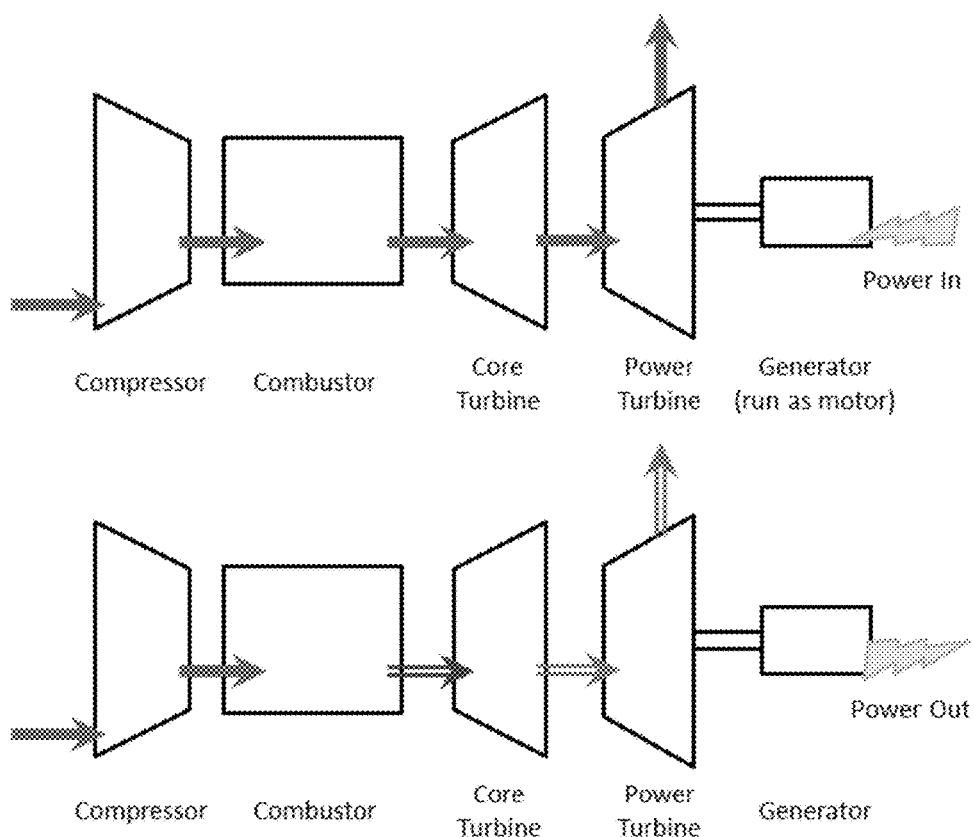
FIG. 39 shows a schematic of a non-limiting embodiment of a power turbine subsystem, having a rotor which can be rotated to high speeds during startup to generate a vacuum and draw ambient air through the core turbo-machine inlet in order to start the microturbine engine.

In another embodiment of the gas turbine, the radial outflow power turbine rotor can be used as a vacuum during startup to draw air through the core turbo-machine inlet and generate sufficient pressure to reach engine idle operating point. The designed flow direction is radially outward when the hot gas drives the power turbine rotor, but at startup an electric motor can drive the power turbine that effectively acts as a compressor. Because the power turbine exhausts to ambient, the driven power turbine rotor generates a vacuum at the power turbine inlet, which draws in air from upstream, which eventually ends up at the core compressor inlet. FIG. 39 shows a schematic of the power turbine subsystem when driven by the electric motor, and resulting vacuum which draws in air through the rest of the engine.

Figure 40:
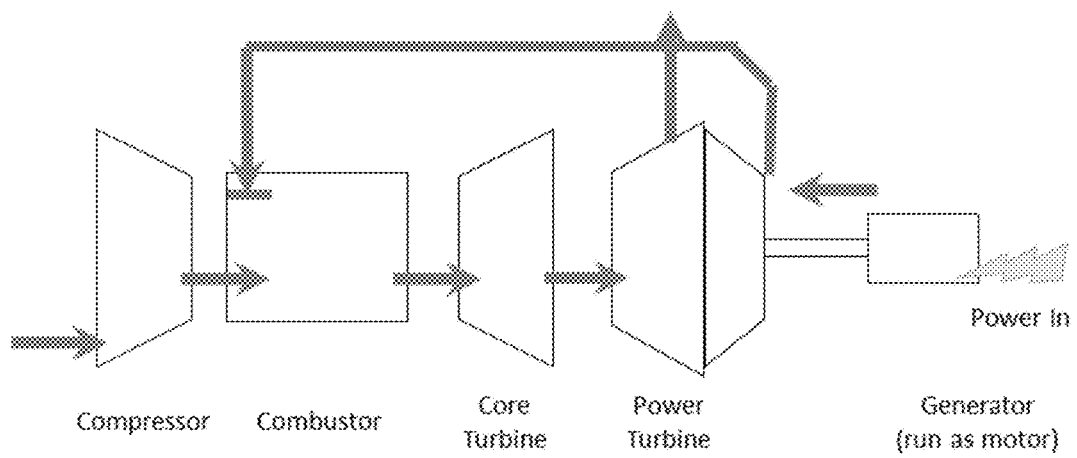
FIG. 40 shows a schematic of a non-limiting embodiment of a power turbine subsystem having a cooling system, in which cooling flow through the system can be used to pressurize the core turbo-machine during startup to start the engine.

The vacuum generated during startup by rotating the power turbine rotor can be further supplemented with flow generated at the cooling blades by routing cooling flow into the core turbo-machine. This provides additional air flow that will increase the core rotor speed and generate additional pressure to make it easier to reach engine idle. FIG. 40 shows a schematic of flow paths in the gas turbine engine with the cooling flow directed into the core turbo-machine. In this system, the cooling flow may be redirected to ambient when the engine has reached self-sustaining operation.

Figure 41:
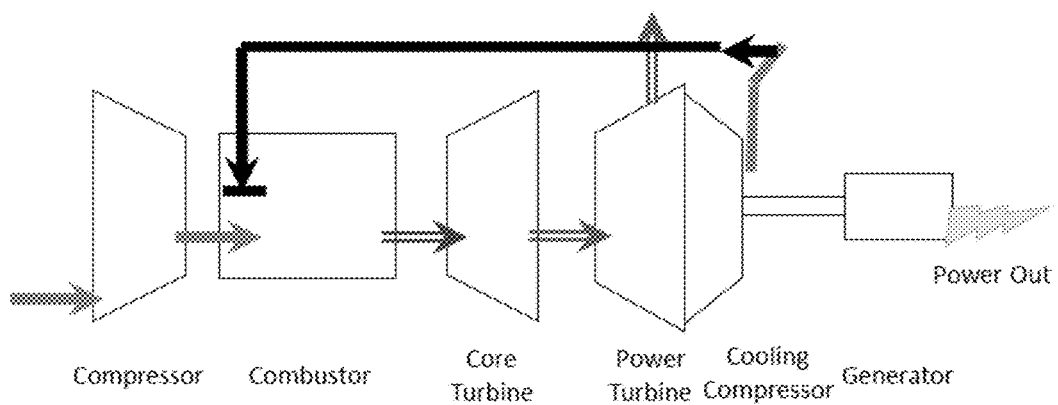
FIG. 41 shows a schematic of a non-limiting embodiment of a power turbine subsystem having a cooling system, in which cooling flow through the system can be routed to the core compressor to provide additional air flow to the engine.

In another embodiment, the cooling flow may continue to be directed into the core turbo-machine to provide additional air mass flow in order to increase total engine power output. FIG. 41 shows a schematic of this gas turbine engine.

Figure 42:
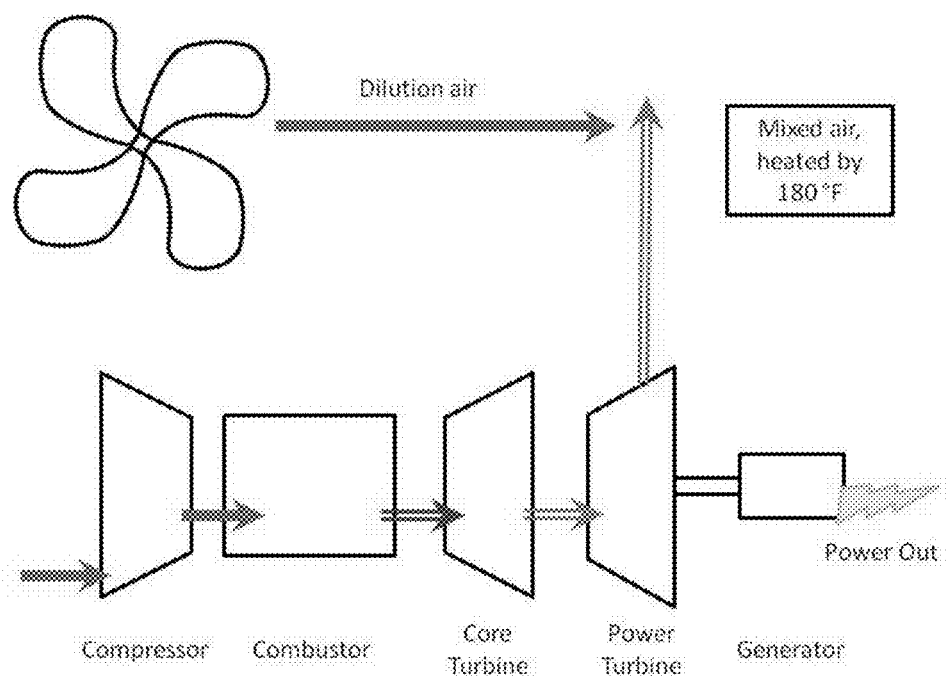
FIG. 42 shows a non-limiting embodiment of a basic direct fire heater based on a microturbine.

In another embodiment, the cooling flow may continue to be directed into the exhaust stream of the power turbine to reduce exhaust gas temperatures. FIG. 42 shows a schematic of this gas turbine engine.

Another embodiment of the Gas Turbine Generator is in use a portable, flameless heater unit. The purpose of this variant is to provide heated air for heating personnel or equipment; in this embodiment heat generation is the primary need, and electricity is secondary or required to operate auxiliary components. Flameless heaters are required where open flames are an explosion risk. Utilizing a turbine in this configuration contains the flame and burns the fuel more cleanly while generating hotter exhaust gas temperatures for a given fuel flow. The dynamo Micropower turbine will be a more efficient than a reciprocating solution, where significant heat is dissipated through a cooling system.

FIG. 42 describes a basic direct fire heater based on a gas turbine, where heat exhausted (over 900° F.) from the turbine or power turbine is directly mixed with dilution air (pumped by a fan or blower) to produce large volumes of heated air. In this configuration a gas powered gas turbine produces less exhaust contaminants, VOCs, CO and NOX such that an indirect heat exchanger is not required. The result is more efficient heat generation. In some configurations the power turbine may or may not be employed; in some iteration, power extraction may be entirely avoided.

Figure 43:
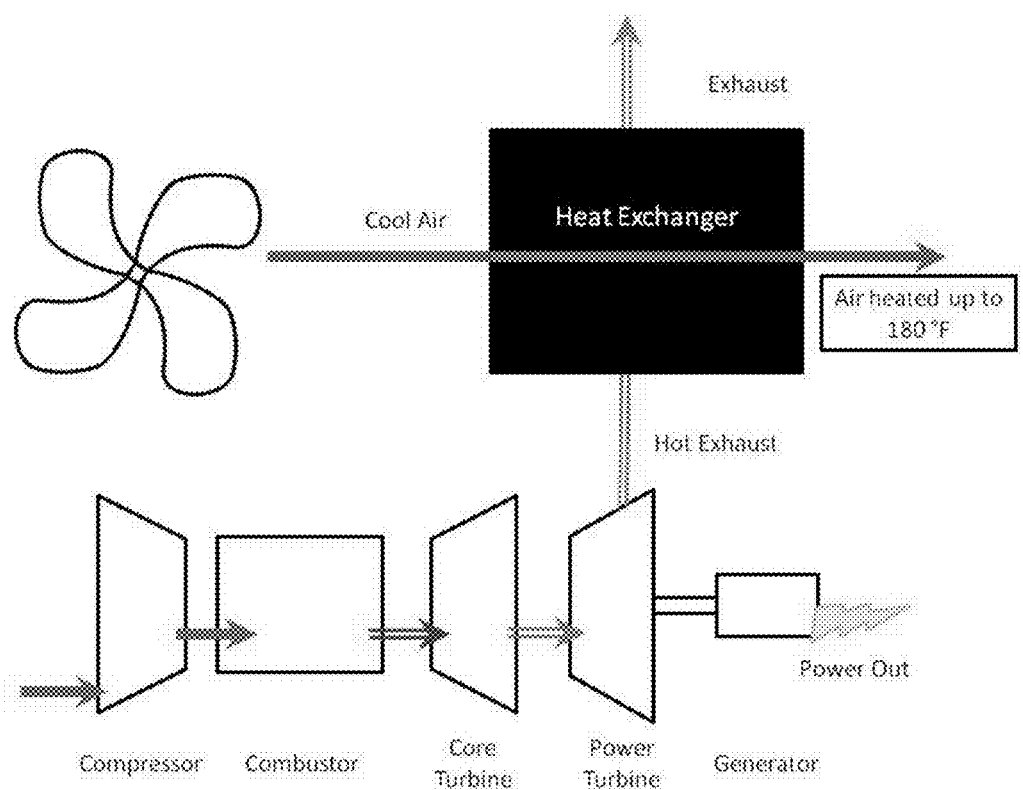
FIG. 43 shows a non-limiting embodiment of an indirectly fired heater based on a microturbine.

FIG. 43 describes an indirectly fired heater based on a gas turbine, where heat is exhausted (over 900° F.) and passed through a heat exchanger to warm air for end use. Because the Exhaust Gas Temperatures of the turbine will be higher than the air from a reciprocating engine, the efficiency of the heat exchanger will generally be higher. This method would be implemented where the fuel and combustion constituents are not clean enough for direct inhalation.

A control loop will control heated air output and will control either fan power and fuel flow to the gas turbine to create air of the appropriate temperature and mass flow.

Figure 44:
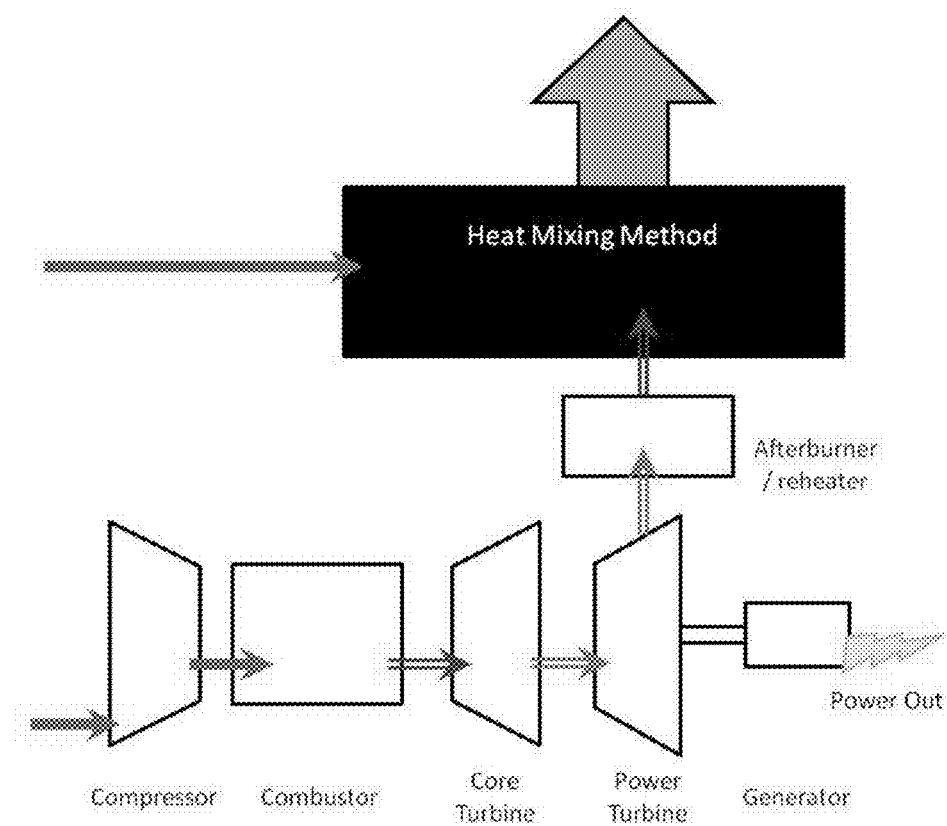
FIG. 44 shows a non-limiting embodiment of a method in which a reheater is implemented behind a core turbine to increase the energy of the air ultimately used to heat the target heater air.

FIG. 44 describes a method where a reheated is implemented behind the core turbine to increase the energy of the air ultimately used to heat the target heater air.

Figure 45:
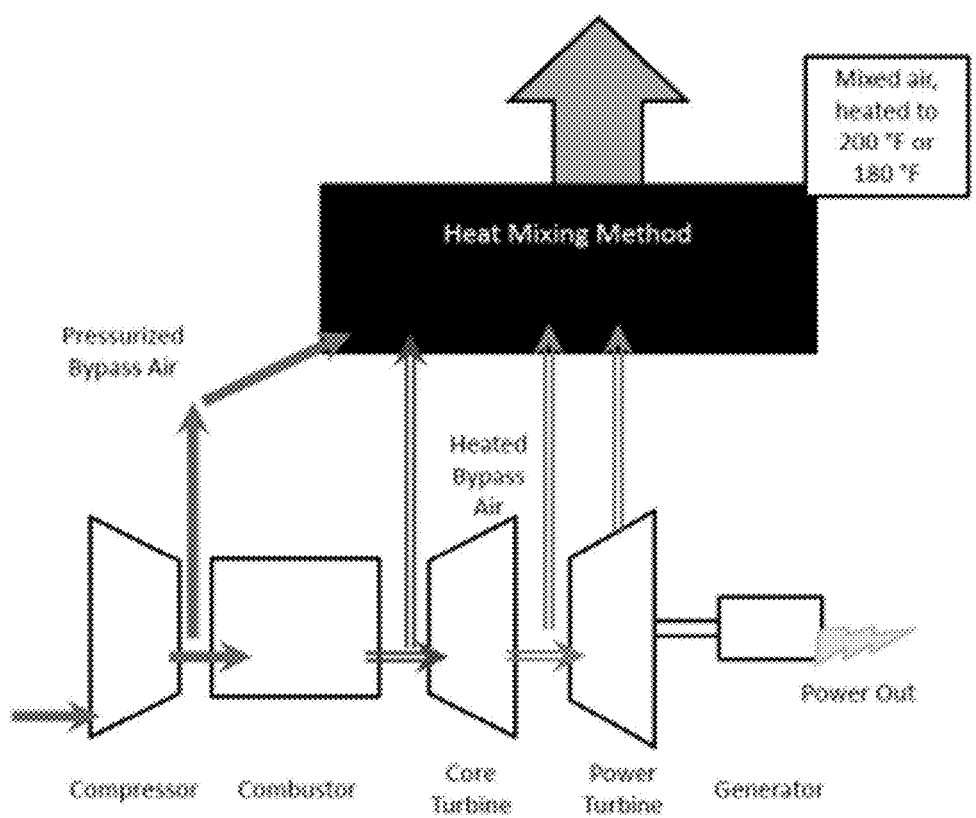
FIG. 45 shows a non-limiting embodiment of a turbine where air of various masses, flows, pressures and temperatures can be used to generate the exhausted air required for use.

FIG. 45 provides for a generalized variant of the turbine where air of various masses flows, pressures and temperatures can be used to generate the exhausted air required for use. Item 1 represents air that is pressurized by a compressor, and bypasses the combustor and turbine and ultimately represents the dilution or heated air. Item 2 represents heated air which bypasses the turbines and is the source air for heating. Item 3 represents heated bypass air which bypasses the power sections of the turbine which is used for heated flow. Item four represents the hot exhaust air employed in other incarnations.

The turbomachinery may be resized for the various air flows and pressures for the various embodiments. The power turbine may be re-optimized for maximizing heat generation.

The following publications are incorporated herein by reference for all purposes i) U.S. Patent Application Publication number US20120210728 A1, which was published on Aug. 23, 2012, and is titled, "Fluid Flow Devices with Vertically Simple Geometry and Methods of Making the Same,"

ii) U.S. Patent Application Publication number US20130269348 A1, which was published on Oct. 17, 2013, and is titled, "Design and manufacturing of an advanced low cost micro-turbine system,"

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, aspects of the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (e.g., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A gas turbine heater comprising:
   i) a gas turbine engine comprising:
      a shaft,
      a compressor configured to rotate about the shaft, and to accept ambient air through a compressor inlet, and to pressurize the air;
      a combustion chamber in fluid communication with an outlet of the compressor, the combustion chamber being configured to receive combustible fuel from a fuel source and to receive air from the outlet of the compressor, such that an air-fuel mixture is created inside the combustion chamber;
      an igniter, at least a portion of which is positioned inside the combustion chamber, the igniter being configured to ignite the air-fuel mixture inside the combustion chamber, thereby generating pressurized, heated air in the combustion chamber; and
      a turbine in fluid communication with an outlet of the combustion chamber, the turbine being configured to rotate about the shaft and extract shaft power from the pressurized, heated air received from the combustion chamber outlet, thereby providing shaft power to drive the compressor;
   ii) a fan configured to draw ambient air;
   iii) a gas turbine air starter configured to provide air for starting the gas turbine engine;
   iv) an electric generator configured to generate electric energy to power the air starter and the fan;
   v) an enclosure configured such that within the enclosure, exhaust gas exiting a turbine outlet mixes with the ambient air drawn by the fan to create a stream of heated air;
   vi.) a heater outlet through which the stream of heated air is directed out of the enclosure; and
   vii) a controller configured to control fan power of the fan to create a desired temperature of the stream of heated air at the gas turbine heater outlet.

2. The gas turbine heater of claim 1, further comprising a fuel manifold that comprises:
   i) a pressure regulator configured to control pressure of combustible fuel supplied to the combustion chamber,
   ii) an ignition fuel flow passage establishing fluid communication between the fuel source and the combustion chamber, and the ignition fuel flow passage comprises:
      an ignition fuel orifice configured for restricting flow of combustible fuel into the combustion chamber during an ignition event; and
      an ignition fuel valve configured for controlling the flow of combustible fuel into the ignition fuel orifice during an ignition event; and
   iii) a second fuel flow passage establishing fluid communication between the fuel source and the combustion chamber, and the second fuel flow passage comprises a fuel valve configured for controlling the flow of additional combustible fuel into the combustion chamber.

3. The gas turbine heater of claim 1, wherein the controller is configured to receive one or more input signals indicative of engine performance metrics, and to generate one or more output signals that control the air starter and the fan.

4. The gas turbine heater of claim 1, wherein the compressor and turbine of the gas turbine engine are components of a turbocharger.

5. The gas turbine heater of claim 1, wherein the enclosure houses:
   a) the gas turbine engine, wherein the gas turbine engine is configured such that the gas turbine exhaust flows into the enclosure, and
   b) the fan, and
   wherein the enclosure further comprises:
      i) a first air inlet port in fluid communication with the fan, wherein the fan is configured to draw ambient air in through the first air inlet port and pump ambient air into the enclosure, and
      ii) a second air inlet port in fluid communication with a compressor inlet, wherein the compressor of the gas turbine engine is configured to draw ambient air into the gas turbine engine through the second air inlet port.

6. The gas turbine heater of claim 1, wherein the enclosure houses the gas turbine engine and the fan, and the enclosure further comprises:
   i) an air inlet port in fluid communication with the fan inlet, and the fan is configured to draw ambient air through the air inlet port;
   ii) a first duct having an inlet in fluid communication with the fan outlet, and the duct is configured to receive ambient air drawn by the fan;
   iii) an air inlet port in fluid communication with the compressor inlet, and the compressor is configured to draw ambient air through the air inlet port into the gas turbine engine;
   iv) a second duct having an inlet in fluid communication with the turbine outlet and being configured to receive gas turbine exhaust; and
   v) a mixing chamber comprising:
      a first inlet configured to receive ambient air from the first duct; and
      a second inlet configured to receive gas turbine exhaust from the second duct;
   such that the ambient air and the gas turbine exhaust mix inside the mixing chamber to create warm air, and the warm air exits the mixing chamber through the heater outlet.

7. The gas turbine heater of claim 1 further comprising an inlet flow diverter, and the inlet flow diverter comprises:
   i) an outlet port in fluid communication with the compressor inlet,
   ii) a first inlet port configured for receiving air from the air starter, and
   iii) a second inlet port having a controllable valve configured to open or close to control fluid communication between the compressor inlet and the ambient air,
   and the gas turbine heater being configured such that during gas turbine engine startup, the valve can be configured in a closed position to force substantially all of the ambient air drawn by the air starter into the compressor, and during steady state gas turbine engine operation, the valve can be configured in an open position to allow the compressor to draw in air from the ambient.

8. The gas turbine heater of claim 1, in which the electric generator is a component of a standalone motor-generator set that is not powered by the gas turbine engine.

9. The gas turbine heater of claim 1, wherein the ambient air drawn by the fan is heated by 180 degrees F.

10. The gas turbine heater of claim 1, wherein the controller is configured to control fuel flow to the combustion chamber to create a desired temperature of the stream of heated air at the gas turbine heater outlet.

* * * * *